US010135116B2

(12) United States Patent
Lee et al.

(10) Patent No.: US 10,135,116 B2
(45) Date of Patent: Nov. 20, 2018

(54) ANTENNA APPARATUS AND ELECTRONIC DEVICE WITH THE SAME

(71) Applicant: Samsung Electronics Co., Ltd., Suwon-si, Gyeonggi-do (KR)

(72) Inventors: Woosup Lee, Suwon-si (KR); Iljong Song, Suwon-si (KR); Jungsik Park, Suwon-si (KR); Youngki Lee, Incheon (KR); Jaesuk Lee, Suwon-si (KR); Hyounghwan Roh, Seoul (KR); Sehwan Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 15/077,122

(22) Filed: Mar. 22, 2016

(65) Prior Publication Data
US 2016/0285151 A1    Sep. 29, 2016

(30) Foreign Application Priority Data
Mar. 27, 2015   (KR) .................. 10-2015-0043321

(51) Int. Cl.
*H01Q 1/24*     (2006.01)
*H01Q 1/38*     (2006.01)
(Continued)

(52) U.S. Cl.
CPC .............. *H01Q 1/242* (2013.01); *H01Q 1/243* (2013.01); *H01Q 1/38* (2013.01); *H01Q 5/321* (2015.01);
(Continued)

(58) Field of Classification Search
CPC ........ H01Q 1/242; H01Q 5/321; H01Q 1/243; H01Q 1/38; H02J 7/025; H04M 1/026; H04M 1/0277
See application file for complete search history.

(56) References Cited

U.S. PATENT DOCUMENTS

| | | | |
|---|---|---|---|
| 5,966,101 A * | 10/1999 | Haub | H01Q 13/10 |
| | | | 343/702 |
| 6,950,410 B1 * | 9/2005 | Brandt | H04B 1/406 |
| | | | 370/276 |

(Continued)

FOREIGN PATENT DOCUMENTS

| | | |
|---|---|---|
| KR | 10-1297195 B1 | 8/2013 |
| WO | 2014/014273 A1 | 1/2014 |
| WO | 2015/007951 A1 | 1/2015 |

*Primary Examiner* — Dieu H Duong
*Assistant Examiner* — Bamidele A Jegede
(74) *Attorney, Agent, or Firm* — Jefferson IP Law, LLP

(57) ABSTRACT

A handheld electronic device is provided. The handheld electronic device includes a front cover forming the front of the handheld electronic device, a back cover forming the back of the handheld electronic device, a side member at least partially surrounding a space between the front cover and the back cover, a display module, housed in the space, with a screen area exposed through the front cover, and a ground plate housed in the space. At least part of the side member and/or the back cover includes a conductive material. The handheld electronic device includes first and second connection terminals electrically connected to the at least part. The at least part forms at least part of an antenna of the handheld electronic device, and comprises first and second areas which are spaced apart from each other. The first area is electrically connected to the second area and the first connection terminal.

10 Claims, 33 Drawing Sheets

(51) Int. Cl.
*H02J 7/02* (2016.01)
*H01Q 5/321* (2015.01)
*H04M 1/02* (2006.01)

(52) U.S. Cl.
CPC .............. *H02J 7/025* (2013.01); *H04M 1/026* (2013.01); *H04M 1/0277* (2013.01)

(56) References Cited

U.S. PATENT DOCUMENTS

| | | | |
|---|---|---|---|
| 8,628,012 B1* | 1/2014 | Wallner | G06K 7/08 |
| | | | 235/380 |
| 8,711,041 B2 | 4/2014 | Han et al. | |
| 2004/0046694 A1* | 3/2004 | Chiang | H01Q 1/242 |
| | | | 342/360 |
| 2004/0147297 A1 | 7/2004 | Mikkola et al. | |
| 2006/0022890 A1* | 2/2006 | Chiang | H01Q 1/242 |
| | | | 343/833 |
| 2007/0216578 A1* | 9/2007 | Ai | H01Q 1/38 |
| | | | 343/700 MS |
| 2009/0121964 A1* | 5/2009 | Yamada | H01Q 1/2225 |
| | | | 343/866 |
| 2010/0277383 A1* | 11/2010 | Autti | H01Q 1/243 |
| | | | 343/749 |
| 2010/0279734 A1* | 11/2010 | Karkinen | H01Q 3/24 |
| | | | 455/554.2 |
| 2010/0289701 A1* | 11/2010 | DeJean | H01Q 9/0414 |
| | | | 343/700 MS |
| 2012/0262345 A1* | 10/2012 | Kim | H01Q 1/243 |
| | | | 343/702 |
| 2012/0287014 A1* | 11/2012 | Tseng | H01Q 1/243 |
| | | | 343/876 |
| 2014/0132462 A1* | 5/2014 | Ying | H01Q 1/243 |
| | | | 343/702 |
| 2014/0218246 A1* | 8/2014 | Ishizuka | H01Q 1/243 |
| | | | 343/749 |
| 2014/0247547 A1 | 9/2014 | Jung et al. | |
| 2014/0285386 A1 | 9/2014 | Merz et al. | |
| 2015/0207207 A1 | 7/2015 | Park et al. | |

\* cited by examiner

FIG. 20A

| SS | FC | PAN | FS | NAME | FS | ADDITIONAL DATA | DISCRETIONARY DATA | ES | LRC |
|---|---|---|---|---|---|---|---|---|---|
| | | (19 Digits max) | | (26 alphanumeric characters Max) | | Expiration data (YYMM) 4 Service Code 3 | •PVKI 1 •PVV or Oset 4 •CVV or -CVC 3 Some or all of the above elds may be found with the discretionary data | | |
| % | B | 1234123412341234 | ^ | TOM/SMITH | ^ | 1908201 | 000000000000000119000000 | ? | |

FIG. 20B

| SS | PAN (19 Digits max) | FS | ADDITIONAL DATA<br>No. of characters<br>Expiration data (YMM) 4<br>Service Code 3 | DISCRETIONARY DATA<br>*PVKI 1<br>*PVV or Oset 4<br>*CVV or *CVC 3<br>Some or all of the above<br>elds may be found with<br>the discretionary data<br>Card Data Format – Track 3 (ISO 4909)<br>104 NUMERIC DATA CHARACTERS<br>SS | ES | LRC |

| ; | 1234123412341234 | = | 1905201 | 0000011900000 | ? | LRC |

FIG. 20C

| SS | FC | PAN (19 Digits max) | FS | USE AND SECURITY DATA<br><br>No. of characters<br>County Code (optional) 3<br>Currency Code 3<br>Currency Exponent 1<br>Am't Authorized per Cycle 4<br>Am't Remaining this Cycle 4<br>Cycle Begin (Validity Data) 4<br>Cycle Length 2<br>Retry Count 1<br>PIN Control Parameters (optional) 6<br>Interchange Controls 1<br>PAN Service Restriction 2<br>SAN-1 Service Restriction 2<br>SAN-2 Service Restriction 2<br>Expiration Data (optional) 4<br>Card Sequence Number 1<br>Card Security Number (optional) 9 | ADDITIONAL DATA<br><br>First subsidiary Account No. (optional)<br>*CVV or *CVC 3<br>Secondary subsidiary Account No. (optional)<br>Relay Marker 1<br>Cryptographic Check Digits 6 (optional)<br>Discretionary Data | ES | LRC |
|---|---|---|---|---|---|---|---|
| + | 01 | 1234123412341234 | = | 5834667805077040=410410300000000000000000000015000 0099991=583466780500000000==Q=030777000000004 | ? | LRC |

FIG. 21
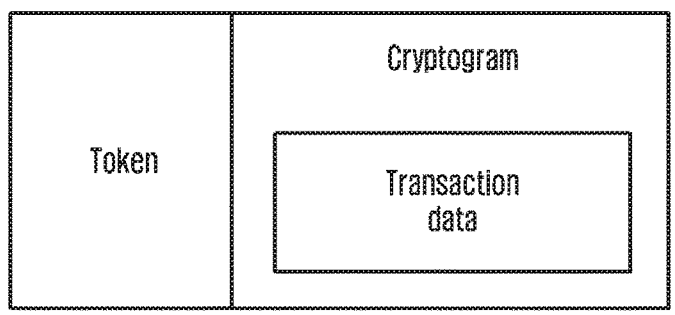
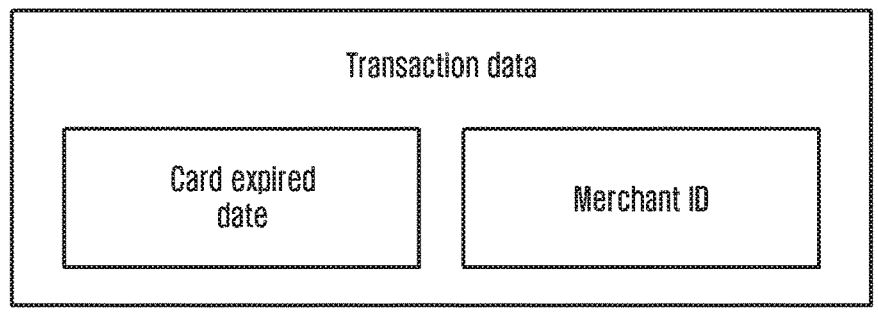

ANTENNA APPARATUS AND ELECTRONIC DEVICE WITH THE SAME

CROSS-REFERENCE TO RELATED APPLICATION(S)

This application claims the benefit under 35 U.S.C. § 119(a) of a Korean patent application filed on Mar. 27, 2015 in the Korean Intellectual Property Office and assigned Serial number 10-2015-0043321, the entire disclosure of which is hereby incorporated by reference.

TECHNICAL FIELD

The present disclosure relates to an antenna apparatus and an electronic device with the antenna apparatus.

BACKGROUND

Electronic devices, such as smartphones, tablet computers, and the like, are capable of providing various functions and application programs, and obtaining information from external electronic devices via wireless communication. The electronic devices are capable of transmitting/receiving information obtained via wireless communication using electromagnetic waves. To this end, the electronic devices may include one or more antennas. Types of antennas for electronic devices may be determined according to at least one of the following: types of network, types of services, regions, and usage.

The electronic devices are capable of including various components (e.g., circuit parts, a case, boards, input/output modules, and the like). The components included in electronic devices may be configured with conductive materials such as metal or non-conductive materials such as plastic.

The performance of an antenna in transmission/reception of electromagnetic waves varies with a distance between the antenna and its other metal components, the size of the antenna (e.g., volume), and the like.

The above information is presented as background information only to assist with an understanding of the present disclosure. No determination has been made, and no assertion is made, as to whether any of the above might be applicable as prior art with regard to the present disclosure.

SUMMARY

Electronic devices need to be equipped with antennas with various characteristics. As the electronic devices decrease in size and increases in the number of functions to be provided, the space for installing antennas is reduced. The electronic devices need to house various types of the antennas in a limited space. Since the components in the electronic devices are conductive, these may lead to a deterioration of a performance of the antennas in terms of transmission/reception.

Aspects of the present disclosure are to address at least the above-mentioned problems and/or disadvantages and to provide at least the advantages described below. Accordingly, an aspect of the present disclosure is to provide an antenna apparatus, part of which uses at least part of the components in an electronic device, thereby improving the efficient use of space for installing the antenna apparatus.

Another aspect of the present disclosure is to provide an antenna apparatus and the electronic device with the antenna apparatus, wherein the antenna apparatus is capable of allowing the electronic device to secure the radiation performance without increasing in the volume of the antenna apparatus.

In accordance with an aspect of the present disclosure, a handheld electronic device is provided. The handheld electronic device includes a front cover forming the front of the handheld electronic device, a back cover forming the back of the handheld electronic device, a side member at least partially surrounding a space between the front cover and the back cover, a display module, housed in the space, with a screen area exposed through the front cover, and a ground plate housed in the space. At least part of the side member and/or the back cover includes a conductive material. The handheld electronic device includes first and second connection terminals electrically connected to the at least part. The at least part forms at least part of an antenna of the handheld electronic device, and comprises first and second areas which are spaced apart from each other. The first area is electrically connected to the second area and the first connection terminal. The second area is electrically connected to the second connection terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 20A to 20C are diagrams show formats of data recorded in tracks of a magnetic card according to various embodiments of the present disclosure;

FIG. 21 is a diagram that describes a data transmission method according to various embodiments of the present disclosure.

Throughout the drawings, like reference numerals will be understood to refer to like parts, components, and structures.

DETAILED DESCRIPTION

Figure 1:
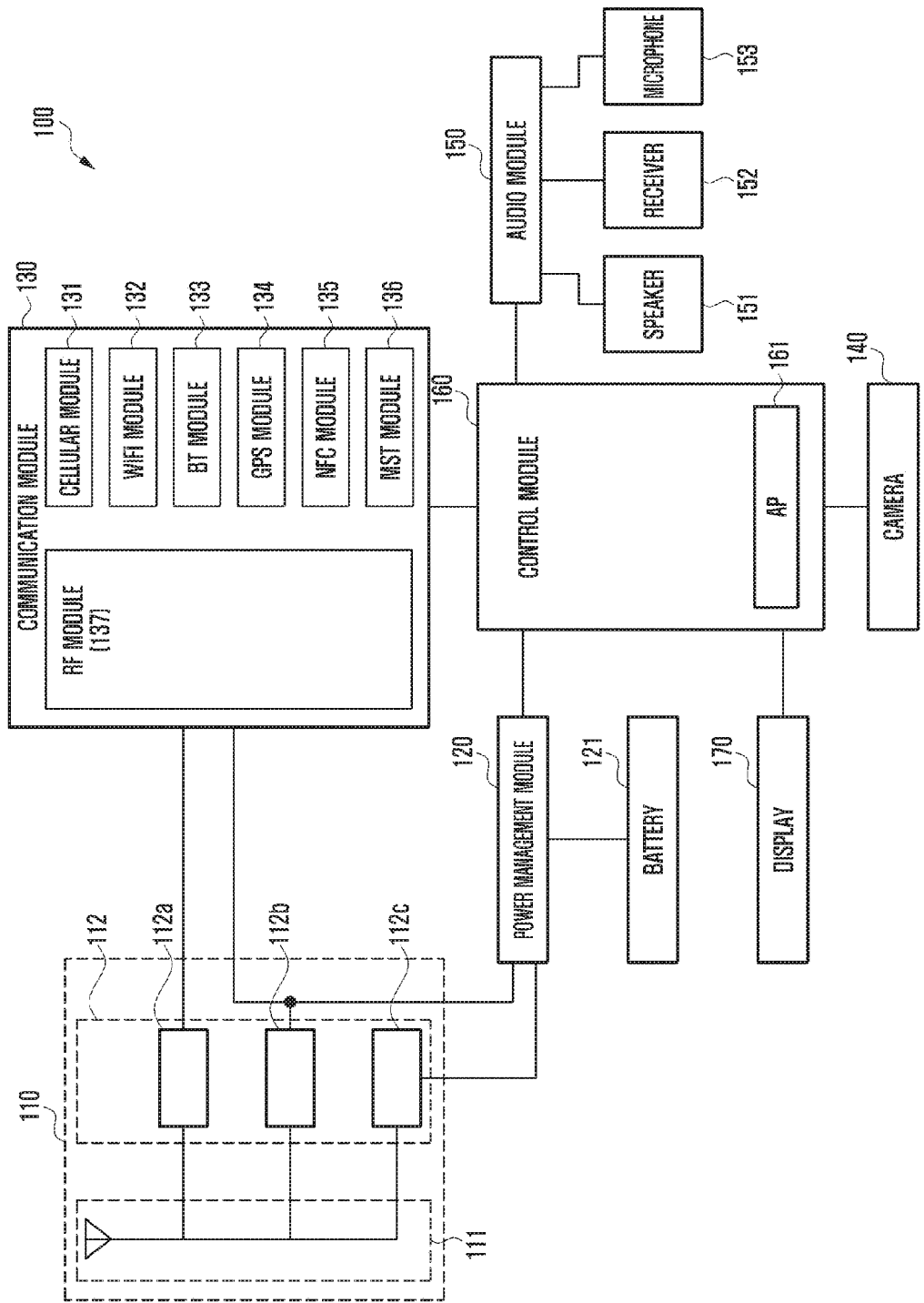
FIG. 1 is a block diagram showing an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the present disclosure, the terms such as "include", "have", "may include" or "may have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. In contrast, when it is stated that a component is "directly coupled to" or "directly connected to" another component, a new component does not exist between the component and another component. In the present disclosure, the expression "configured (or set) to do" may be used to be interchangeable with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., central processing unit (CPU) or application processor (AP)) that may execute one or more software programs stored in a memory device to perform corresponding functions.

In the present disclosure, the term 'screen' may refer to the displaying area of a display unit. For example, in the expressions 'a card (or image thereof) is displayed on the screen,' 'the display unit shows (displays) a card on the screen,' and 'the controller controls the display unit to show (display) a card on the screen,' the term 'screen' is used in the sense of a displaying area of the display unit. In addition, the term 'screen' may refer to a displayed object shown on the display unit. For example, in the expressions 'a card screen is displayed,' 'the display unit shows (displays) a card screen,' and 'the controller controls the display unit to show (display) a card screen,' the term 'screen' is used in the sense of a displayed object shown on the display unit.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including an antenna. For example, the electronic device may be one or more of the following: a smart phone, a tablet personal computer (PC), a mobile phone, a video phone, an e-book reader, a desktop PC, a laptop PC, a netbook computer, a personal digital assistant (PDA), portable multimedia player (PMP), Moving Picture Experts Group phase 1 or phase 2 (MPEG-1 or MPEG2 audio layer 3 (MP3) player, a mobile medical application, a camera, and a wearable device (e.g., a head-mounted-device (HMD), such as electronic glasses, electronic clothes, an electronic bracelet, an electronic necklace, an electronic appcessory, an electronic tattoo, and a smart watch).

According to various embodiments, the electronic device may be a smart home appliance having an antenna. The smart home appliance may include at least one of the following: a television (TV), a digital versatile disc (DVD) player, an audio player, an air conditioner, a cleaner, an oven, a microwave oven, a washing machine, an air purifier, a set-top box, a TV box (e.g., Samsung HomeSync™, Apple TV™, or Google TV™), game consoles, an electronic dictionary, an electronic key, a camcorder, and an electronic frame.

According to various embodiments, the electronic device may include at least one of the following: various types of medical devices (e.g., magnetic resonance angiography (MRA), magnetic resonance imaging (MRI), computed tomography (CT), a scanner, an ultrasonic device and the like), a navigation device, a global positioning system (GPS) receiver, an event data recorder (EDR), a flight data recorder (FDR), a vehicle infotainment device, electronic equipment for a ship (e.g., a navigation device for ship, a gyro compass and the like), avionics, a security device, a head unit for a vehicle, an industrial or home robot, an automatic teller machine (ATM) of financial institutions, and a point of sale (POS) device of shops.

According to various embodiments, the electronic device may include at least one of the following: furniture or a part of a building/structure, an electronic board, an electronic signature receiving device, a projector, and various types of measuring devices (e.g., a water meter, an electricity meter, a gas meter, a radio wave meter and the like), which are equipped with an antenna. The electronic device according to various embodiments of the present disclosure may also be a combination of the devices listed above. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments will be discussed with reference to the accompanying drawings.

FIG. 1 is a block diagram showing an electronic device according to various embodiments of the present disclosure.

Referring to FIG. 1, an electronic device 100 is capable of including an antenna apparatus 110, a power management module 120, a battery 121, a communication module 130, a camera 140, an audio module 150, a speaker 151, a receiver 152, a microphone 153, a control module 160, and a display 170.

The antenna apparatus 110 may be an antenna configured to perform communication via cellular, Wi-Fi, Bluetooth (BT), GPS, near field communication (NFC), and magnetic secure transmission (MST). The antenna apparatus 110 may also be an antenna capable of wireless charging for the battery 121.

The antenna apparatus 110 is capable of including a radiation module 111 and/or a connection module 112. The radiation module 111 is capable of converting the amount of current from the communication module 130 into electromagnetic waves and radiating them to the outside. The radiation module 111 is also capable of converting electromagnetic waves from the outside into current and transferring the current to the power management module 120 or communication module 130. The radiation module 111 serves as a passive component for transmission/reception of electromagnetic waves.

The connection module 112 is capable of including two or more connection modules (e.g., first connection module 112a, second connection module 112b, and third connection module 112c). The connection module 112 and radiation module 111 may be electrically coupled with each other. The connection module 112 is electrically couple with the radiation module 111 and the communication module 130 when the antenna apparatus 110 is connected with (installed to or coupled with) the electronic device 100. The antenna apparatus 110 is physically or functionally coupled with the electronic device 100. At least part of the connection module 112 may be placed on a printed circuit board (PCB) of the electronic device 100. For example, the connection module 112 is capable of including an impedance matching circuit installed onto the PCB, wires and terminals connected to the radiation module 111, and the like.

The connection module 112 (e.g., the first and second connection modules 112a and 112b) is capable of feeding current from the communication module 130 to the radiation module 111. The connection module 112 (e.g., the first and second connection modules 112a and 112b) is also capable of transferring current from the radiation module 111 to the communication module 130. The connection module 112 (e.g., the second and third connection modules 112b and 112c) is also capable of transferring current from the radiation module 111 to the power management module 120.

The matching circuit of the connection module 112 is electrically connected to the radiation module 111. For example, when the antenna apparatus 110 is coupled to the electronic device 100, the matching circuit electrically contacts the PCB, so that the radiation module 111 and the PCB (e.g., the ground of the PCB) are electrically connected to each other. For example, the matching circuit matches the impedance between the radiation module 111 and the connection module 112. The matching circuit is capable of including one or more circuit components. Specially, the matching circuit may include at least one of the following: capacitors, inductors, and resistors, as lumped elements. The matching circuit may include at least one of the following: strip lines and micro strip lines, as distributed elements. Alternatively, the PCB may include a matching circuit. Additionally, a matching circuit may be located between the antenna apparatus 110 and the PCB.

The power management module 120 is capable of management of power in the electronic device 100. Although it is not shown, the power management module 120 is capable of including a power management integrated circuit (PMIC), a charger IC, or a battery or fuel gauge.

The PMIC may be mounted in an IC or a system on chip (SoC) semiconductor. Charging methods may be classified as wired charging and wireless charging. The charger IC is capable of charging a battery, and preventing an overvoltage or excess current from being induced or flowing from a charger. According to an embodiment, the charger IC may include a charger IC for at least one of the wired charging and the wireless charging methods. Examples of the wireless charging method include alliance for wireless power (A4WP), wireless power consortium (WPC), and the like. To perform wireless charging in the electronic device 100, additional electronic parts are required, such as an antenna apparatus, a resonance circuit, a rectifier, and the like. In this case, the antenna apparatus converts electromagnetic waves of frequency of WPC (e.g., 100 KHz) into current and transfers the current to the power management module 120. The antenna apparatus also converts electromagnetic waves of frequency of A4WP (e.g., 6.5 MHz) into current and transfers the current to the power management module 120.

The battery gauge is capable of measuring, for example, the remaining capacity, a charge level, a level of voltage while charging, a temperature of the battery 121, and the like. The battery 121 is capable of storing or generating electric power and also supplying the stored or generated electric power to the electronic device 100. Examples of the battery 121 are a rechargeable battery, a solar battery, and the like.

The communication module 130 allows the electronic device 100 to communicate with other electronic devices on the network. The communication module 130 is capable of transmitting/receiving data to/from other electronic device via the antenna apparatus 110. In an embodiment, the communication module 130 is capable of including a cellular module 131, a Wi-Fi module 132, a BT module 133, a GPS module 134, a magnetic field communication module (e.g., an NFC module 135 and/or an MST module 136), and a radio frequency (RF) module 137. Magnetic field communication may be implemented with NFC, MST or near field magnetic data stripe transmission, and the like. These communication methods are distinguished from each other, in terms of data rate (bit/sec), communication range, and frequency band. While NFC provides bidirectional communication capability, MST has unidirectional communication capability (e.g., one party transmits information without a ping signal and another receives it at the same time).

The cellular module 131 is capable of providing a voice call, a video call, a short message service (SMS) service, an Internet service, and the like, via a communication network (e.g., long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), and the like). The cellular module 131 is further capable of identifying and authenticating an electronic device in a communication network by using a subscriber identification module (SIM) (e.g., the SIM card (not shown)). According to an embodiment, the cellular module 131 is also capable of performing at least part of the functions provided by an application processor (AP) 161. For example, the cellular module 131 is capable of performing at least a multimedia control function.

According to an embodiment, the cellular module 131 may include a communication processor (CP). The cellular module 131 may be implemented as an SoC. Although the cellular module 131 (e.g., a CP) is shown as a separate element from the AP 161 in FIG. 1, the AP 161 may be implemented to include at least part (e.g., the cellular module 131) of the aforementioned elements according to an embodiment.

According to an embodiment, the AP 161 or the cellular module 131 (e.g., a CP) may load commands or data, received from at least one of a non-volatile memory and other elements connected thereto, onto a volatile memory, and process the loaded commands or data. The AP 161 or the cellular module 131 may store data, received from or generated by at least one of other elements, in a non-volatile memory.

Each of the Wi-Fi module 132, the BT module 133, the GPS module 134, the NFC module 135 or MST module 136 may include a processor for processing data transmitted or received via the corresponding module. Although the cellular module 131, the Wi-Fi module 132, the BT module 133, the GPS module 134, the NFC module 135 or MST module 136 are shown as separate blocks in FIG. 1, at least part (e.g., two or more) of the cellular module 131, the Wi-Fi module 132, the BT module 133, the GPS module 134, the NFC module 135 or MST module 136 may be included in one IC or one IC package according to an embodiment. For example, at least part of processors corresponding to the cellular module 131, the Wi-Fi module 132, the BT module 133, the GPS module 134, the NFC module 135 or MST module 136 respectively (e.g., a CP corresponding to the cellular module 131 and a Wi-Fi processor corresponding to the Wi-Fi module 132) may be implemented as one SoC.

The RF module 137 is capable of performing data transmission/reception, for example, RF signal transmission/reception. Although it is not shown in the drawing, the RF module 137 is capable of including a transceiver, a power amp module (PAM), a frequency filter, a low noise amplifier (LNA), and the like. Although FIG. 1 shows that the cellular module 131, the Wi-Fi module 132, the BT module 133, the GPS module 134, and the NFC module 135 share one RF module 137, at least one of the following: the cellular module 131, the Wi-Fi module 132, the BT module 133, the GPS module 134, and the NFC module 135 may perform RF signal transmission/reception via a separate RF module according to an embodiment.

The camera module 140 refers to a device capable of taking both still and moving images. In an embodiment, the camera module 140 is capable of including one or more image sensors (e.g., a front sensor or a rear sensor), a lens (not shown), an image signal processor (ISP), or a flash (e.g., a light emitting diode (LED) or xenon lamp).

The audio module 150 is capable of performing a conversion between audios signals and electrical signals. The audio module 150 is capable of processing audios output from/input to a speaker 151, a receiver 152, a microphone 153, earphones (not shown), and the like.

The control module 160 is capable of controlling the entire operation of the electronic device 100 and signal flows among the components in the electronic device 100. The control module 160 is also capable of processing data in the electronic device 100. For example, the control module 160 is capable of including an AP 161.

The display module 170 is capable of displaying various types of information (e.g., multimedia data, text data, and the like).

Each of the elements/units of the electronic device 100 described above may be implemented with one or more components, and may be called different names according to the various types of the electronic devices. The electronic device 100 may include one or more elements described above. The electronic device 100 may be modified in such a way as to remove part of the elements or include new elements. In addition, the electronic device 100 may also be modified in such a way that parts of the elements are integrated into one entity that performs their original functions.

In the present disclosure, the terminology Ts of the elements are integrated into one entity that performs their original functions. While the terminology disclosure, the terminology Ts of the elements are integrated into one 'k,' '~component,' '~circuit,' and the like. A 'module' may be the least unit or a part of an integrated component. A 'module' may be the least unit or a part thereof that can perform one or more functions. A 'module' may be implemented in mechanical or electronic mode. For example, terminology disclosure, the terminology Ts of the elements are integrated into one 'k,' '~component,' '~circuit,' and the like. A 'module' may be the least unit or a part of an integrated component. A 'module' may be the least unit or a part thereof that perform functions that are known or will be developed.

Figure 2A:
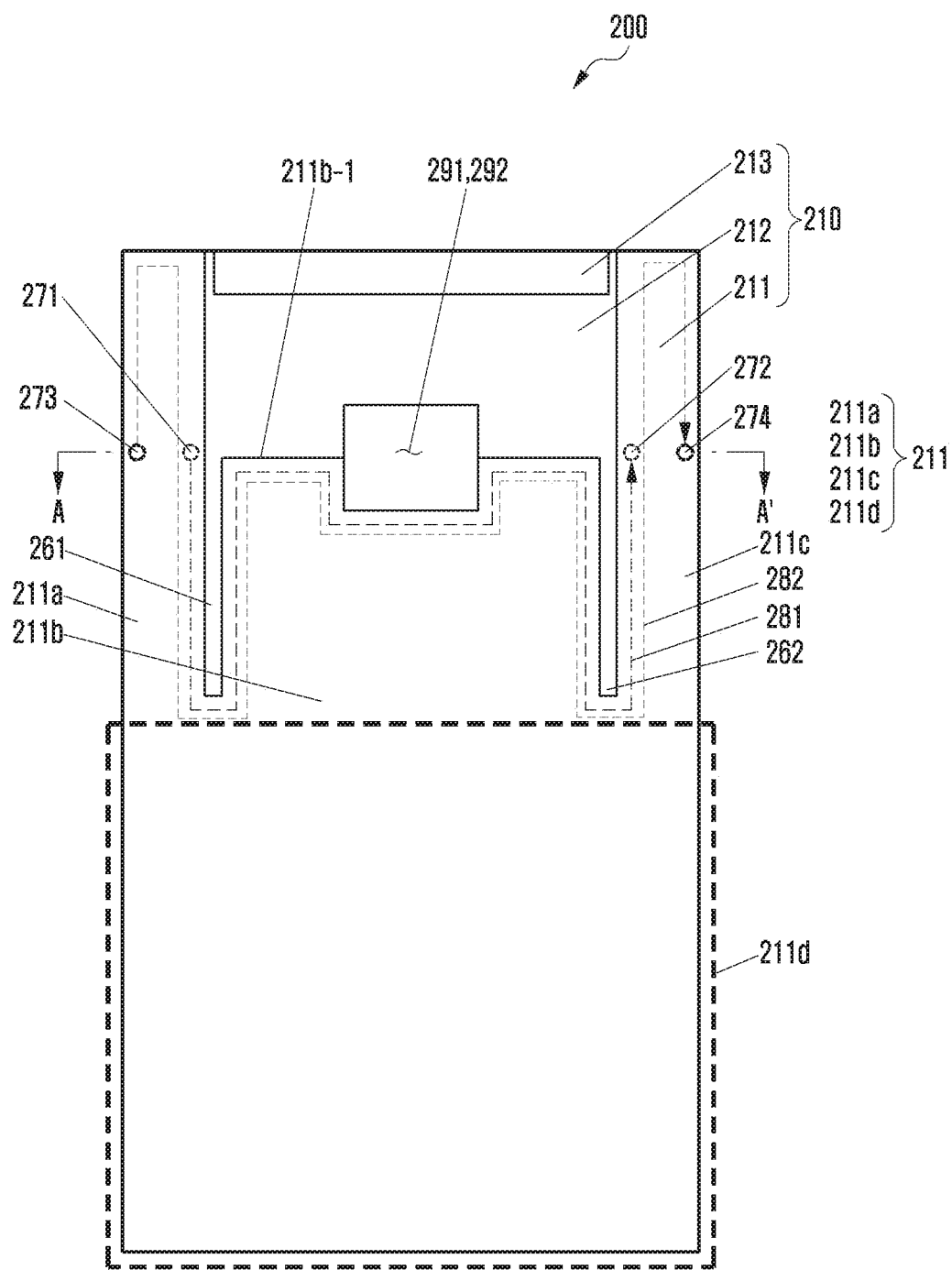
FIGS. 2A and 2B are diagrams showing an antenna apparatus with an external cover capable of serving as a radiator according to various embodiments of the present disclosure.
Figure 2B:
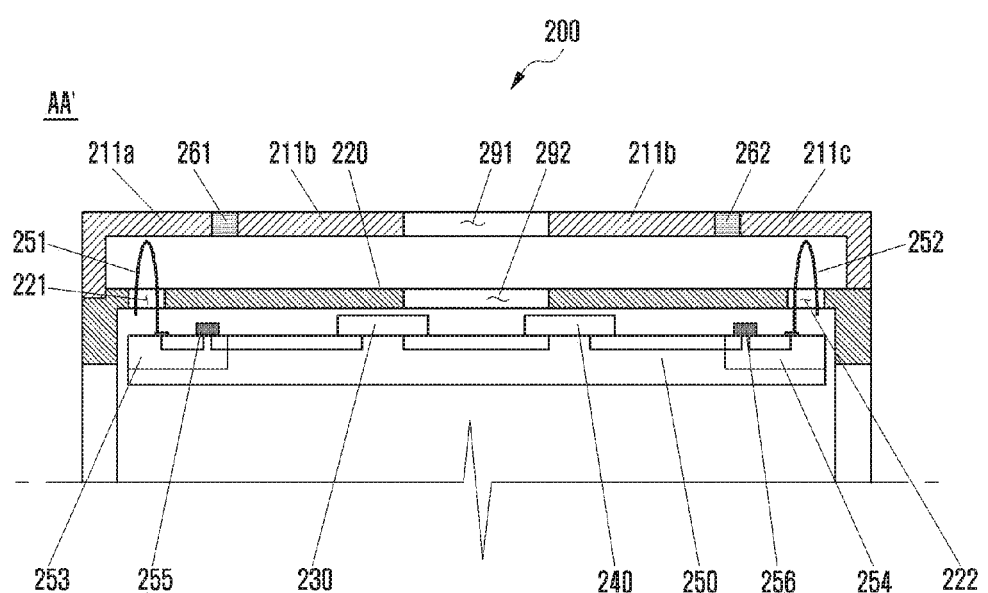

FIGS. 2A and 2B are diagrams showing an antenna apparatus with an external cover capable of serving as a radiator according to various embodiments of the present disclosure. FIG. 2A is a front view of the antenna apparatus, and FIG. 2B is a cross-sectional view of the antenna apparatus, taken along line A-Aw shown in FIG. 2A.

Referring to FIGS. 2A and 2B, an antenna apparatus 200 may form part or all of the antenna apparatus 110 shown in FIG. 1.

The antenna apparatus 200 is capable of including an external cover 210, an internal cover (or rear) 220, a connection module 230, and a communication module 240.

The antenna apparatus 200 may further include a substrate 250 configured to provide electrical signals to the antenna apparatus 200. The substrate 250 may be implemented using a PCB and/or a flexible PCB (FPCB). The substrate 250 is capable of feeding/receiving current to/from the external cover 210. The substrate 250 may also serve as a ground plate for grounding the antenna apparatus 200. The connection module 230 and the communication module 240 are mounted on the substrate 250 and are electrically connected to each other via wires. The connection module 230 and the communication module 240 are electrically connected to the external cover 210 via first and second connection terminals 251 and 252. For example, the first and second connection terminals 251 and 252 are exposed to the outside through first and second through-holes 221 and 222 formed in the rear 220, respectively, and contact the external cover 210. The first and second connection terminals 251 and 252 may be implemented with a resilient pin (e.g., a c-clip). The substrate 250 may include dielectric substances (e.g., first and second dielectric substances 253 and 254). The first and second connection terminals 251 and 252 may be mounted on the first and second dielectric substances 253 and 254, respectively. The first connection terminal 251 is connected to the connection module 230 via a first capacitor 255. The second connection terminal 252 is connected to the communication module 240 via a second capacitor 256. The capacitors 255 and 256 are used to prevent electric shock, and may have a capacitance of 10~1000 pF.

The connection module 230 is capable of including various electric circuits. For example, electric circuits may be configured to include passive components, active components, micro strip lines, strip lines, inter-digital structures, or a combination thereof. An electric circuit may alter an impedance (e.g., an input impedance) corresponding to an antenna apparatus 200, according to characteristics (e.g., capacitance, inductance, resistance, and the like). A passive component may include at least one of the following: capacitors, inductors, and resisters. An active component may include at least one of the following: a diode, a field effect transistor (FET), and a bipolar junction transistor (BJT). An inter-digital structure may be implemented in such a way that passive components and/or active components are formed into a chip or package or mounted on a substrate. An electric circuit may compensate physical dimensions of an antenna by adjusting the electrical length of an antenna apparatus.

The external cover 210 may be implemented in such a way that at least part of the body is made of a conductive material (e.g., metal). The external cover 210 may form part of the case of the electronic device 100. For example, the external cover 210 may form part or all of the one side (e.g., back side) of the electronic device 100. The external cover 210 may be a cover for protecting the battery and rear 220 of the electronic device 100. The external cover 210 may be implemented in such a way that part of the body is protected by a nonconductive material (e.g., glass). The external cover 210 may be detachably assembled to the electronic device 100.

The external cover 210 may form at least part of the radiation module 111 shown in FIG. 1. The external cover 210 may include first, second and third areas 211, 212 and 213.

The first area 211 may include a top area (211a, 211b and 211c) and a bottom area 211d. The top area may be formed with a conductive material. The bottom area 211d may be formed with a non-conductive material (e.g., plastic). The first area 211 may also be formed with a single conductive material, without distinguishing between the top and bottom areas.

The top area of the first area 211 may be formed to include one or more slits which are extended inward from the periphery, being shaped as a straight line. For example, the top area may form first and second slits 261 and 262 therein. As shown in FIGS. 2A and 2B, the slits 261 and 262 may be arranged in a symmetrical form. From these slits 261 and 262, the top area may include a first section 211a located at the right of the first slit 261; a second section 211b located between the first and second slits 261 and 262; and a third section 211c located at the left of the second slit 262.

As the top area of the first area 211 is made of a conductive material and includes one or more slits formed thereon. The first area 211 may be used as a radiator of the electronic device 100 (i.e., a passive component for transmission/reception of electromagnetic waves). For example, the first connection terminal 251 contacts a first feeding point 271 located at the first section 211a; and the second connection terminal 252 contacts a second feeding point 272 located at the third section 211c. The feeding points 271 and 272 may be arranged in a symmetric form, or in such a way as to adjacent to the edge of corresponding areas (e.g., the first feeding point 271 is adjacent to the first slit 261 and the second feeding point 272 is adjacent to the second slit 262). When current is supplied to the first feeding point 271 or the second feeding point 272, the current flows from a corresponding proximity point (e.g., the first feeding point 271) to another feeding point (e.g., the second feeding point 272) along the edge of the top area (e.g., a portion adjacent to the first slit 261, a top edge 211b_1 of the second section 211b, and a portion adjacent to the second slit 262). That is, when current is supplied to the first feeding point 271, a first current path 281 along which the current flows is formed on the top area as shown in FIG. 2A. As the first current path 281 produces magnetic fields on the top area of the first area 211, an RF signal (i.e., electromagnetic waves) of a particular frequency corresponding to the length of a radiator (i.e., the length of the first current path 281) is selected (resonated) and thus emitted to the outside. According to the reciprocal principle of an antenna, the top area of the first area 211 receives the RF signal of a particular frequency via the first current path 281, converts the received RF signal into current, and transfers the current to the communication module 240. In an embodiment, the communication module 240 may be replaced with a power management module (e.g., power management module 120). That is, the top area of the first area 211 may be used for wireless charging for a battery or for performing data communication.

Proximity points may be located at any positions according to types of antennas, performance of an antenna, types of networks, and the like. According an embodiment, another proximity points may be replaced with a first feeding point 271 and a second feeding point 272. For example, a third feeding point 273 may be located adjacent to the outer wall of the first section 213a, and a fourth feeding point 274 may be located adjacent of the outer wall of the third section 213c. Therefore, the second current path 282 may be formed on the top area of the first area 211. For example, the second current path 282 may be longer than the first current path 281 as shown in FIG. 2A. Accordingly, the second current path 282 resonates at a frequency lower than the first current path 281.

According to an embodiment, another proximity point may additionally be located in the top area of the first area 211. When another proximity point is additionally located in the top area of the first area 211, the top area of the first area 211 may be used as a radiator of a multiple antenna apparatus. The multiple antenna apparatus may refer to an antenna apparatus that is capable of selecting one of the frequencies and transmitting/receiving RF signals via the selected frequency. For example, when current is fed to the top area of the first area 211 via the first feeding point 271 and the fourth feeding point 274, RF signals of a particular frequency corresponding to a distance between the first feeding point 271 and the fourth feeding point 274 may be transmitted/received via the top area of the first area 211. When current is fed to the top area of the first area 211 via the third feeding point 273 and the second feeding point 272, RF signals of a particular frequency corresponding to a distance between the third feeding point 273 and the second feeding point 272 may be transmitted/received via the top area of the first area 211.

Unlike the configuration of the first area 211 (e.g., the top area), the second area 212 may be made of a non-conductive material (e.g., plastic). The electronic device 200 may form a separate radiator in the inside (e.g., the rear 220 or the substrate 250), which differs from that of the external cover 210 (e.g., the top area). Since the second area 212 is made of a non-conductive material, the radiator is capable of transmitting/receiving electromagnetic waves to/from the outside, without the interruption of the second area 212. The slits 261 and 262 may be filled with a non-conductive material. For example, a non-conductive material forming the second area 212 may extend into and fill the slits 261 and 262.

The third area 213 is made of a conductive material and is insulated from the first area 211 (e.g., this is because the second area 212 serving as a non-conductive material is placed between the third area 213 and the first area 211). Therefore, the third area 213 may be used as a radiator that differs from the first area 211. For example, the antenna apparatus 200 may include an internal radiator (e.g., wires) in the inside (e.g., rear 220 or substrate 250). The internal radiator may be formed in a location opposite the third area 213. The internal radiator and the third area 213, which are metals, may be spatially apart from each other. That is, a free space (i.e., empty space) may be formed between the internal radiator and the third area 213. For example, the interval between the internal radiator and the third area 213 may be set to a distance (e.g., 1 mm, and the like) that causes a coupling effect. Additionally, an insulator may be inserted between the internal radiator and the third area 213. The insulator may be made of a non-conductive material, such as, plastic, resin, adhesive, glass fiber, and the like. The insulator may also be a dielectric substance with permittivity. Electromagnetic waves are produced by the internal radiator and then emitted to the outside by the third area 213 coupled with the internal radiator. The third area 213 may also electrically be connected to the substrate 250 via wires, pins, and the like.

A first through-hole 291 may be formed in part of the second section 211b of the first area 211 and part of the second area 212. In addition, a second through-hole 292 may be formed at a location, opposite the first through-hole 291, in the rear 220. The through-holes 291 and 292 are formed to allow other components (e.g., a camera, a sensor, a flash, a speaker, and the like) of the electronic device (e.g., electronic device 100) to be exposed to the outside.

Figure 3:
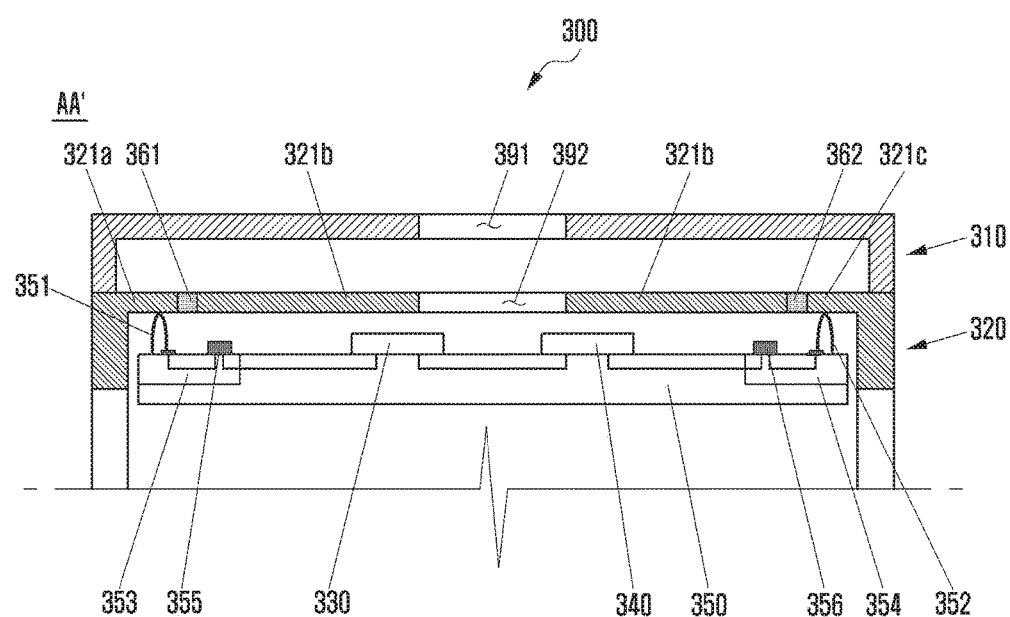
FIG. 3 is a cross-sectional view showing an antenna apparatus with an internal cover capable of serving as a radiator according to various embodiments of the present disclosure.

FIG. 3 is a cross-sectional view showing an antenna apparatus with an internal cover capable of serving as a radiator according to various embodiments of the present disclosure.

Referring to FIG. 3, an antenna apparatus 300 is capable of including an external cover 310, an internal cover 320, a connection module 330, a communication module 340 and a circuit substrate 350.

The external cover 310 may be implemented in such a way that part or all of the body is made of a non-conductive material.

The internal cover 320 may be implemented in such a way that at least part of the body is made of a conductive material. In particular, the internal cover 320 may be arranged in such a way that at least part of the body faces part of the external cover 310, which is made of a non-conductive material.

The conductive part of the internal cover 320 may form first and second slits 361 and 362 which are arranged in a symmetrical form. From these slits 361 and 362, the conductive part of the internal cover 320 may include a first section 321a located at the right of the first slit 361; a second section 321b located between the first and second slits 361 and 362; and a third section 321c located at the left of the second slit 362. As at least part of the internal cover 320 is made of a conductive material and forms slits and part of the external cover 310, facing the least part of the internal cover 320, is made of a non-conductive material, the at least part of the internal cover 320 may be used as a first radiator of the antenna apparatus 300.

The connection module 330 and the communication module 340 are mounted on the circuit substrate 350 and are connected to each other via wires. The connection module 330 and the communication module 340 are electrically connected to the first section 321a and the third section 321c via the first and second connection terminals 351 and 352. The circuit substrate 350 may include dielectric substances (e.g., first and second dielectric substances 353 and 354). The first and second connection terminals 351 and 352 may be mounted on the first and second dielectric substances 353 and 354, respectively. The first connection terminal 351 is connected to the connection module 330 via a first capacitor 355. The second connection terminal 352 is connected to the communication module 340 via a second capacitor 356. The capacitors 355 and 356 are used to prevent electric shock, and may have a capacitance of 10~1000 pF.

The external cover 310 may form a first through-hole 391 in the inside and a second through-hole 392 at a location of the internal cover 320, facing the first through-hole 391, thereby exposing other components (e.g., a camera, a sensor, a flash, a speaker, and the like) of the electronic device to the outside through the holes 391 and 392.

In an embodiment, since the external cover 310 or internal cover 320 is formed in such a way that part of the body is made of a conductive material and is electrically insulated from part of the internal cover 320, the conductive part may be used as a second radiator.

In an embodiment, the communication module 340 may be replaced with a power management module (e.g., power management module 120). In this case, at least part of the internal cover 320 may be used for wireless charging for a battery.

Figure 4:
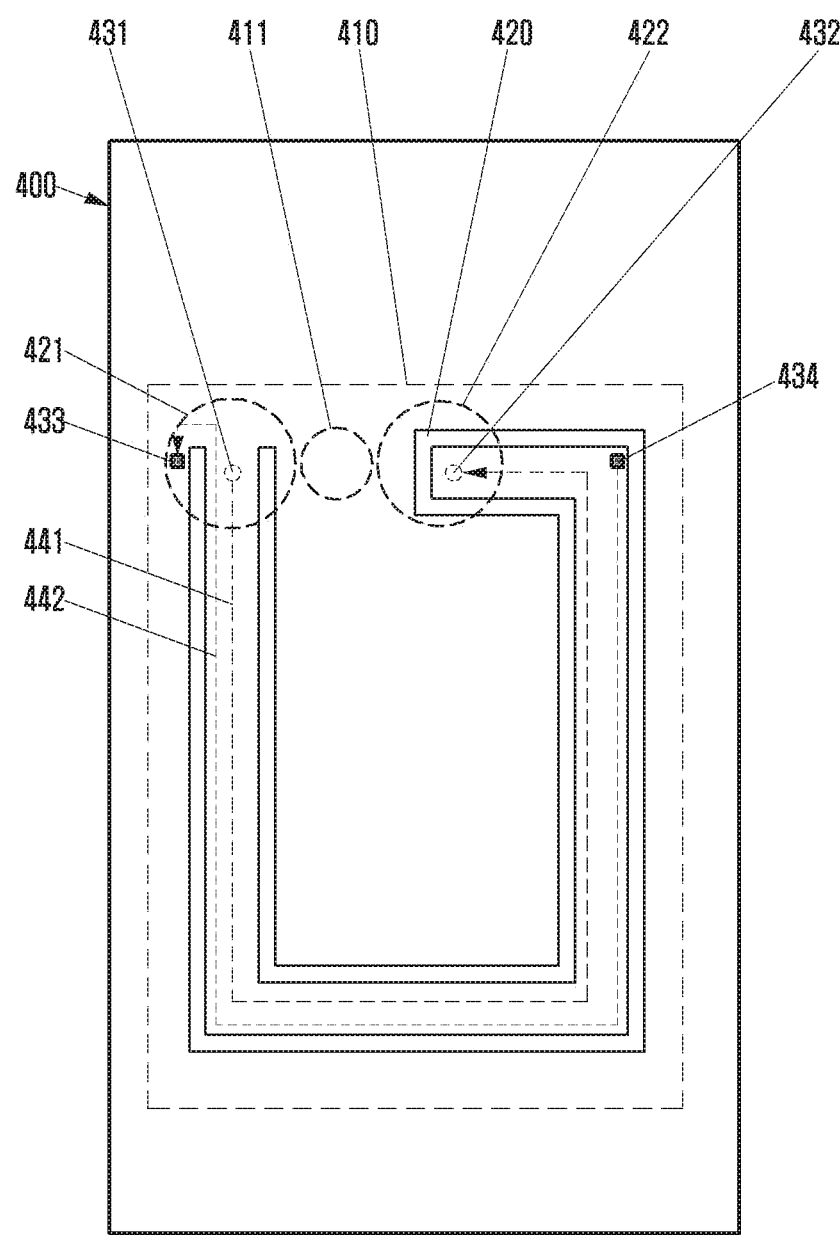
FIG. 4 is a front view showing a cover capable of serving as a radiator according to various embodiments of the present disclosure.

FIG. 4 is a front view showing a cover capable of serving as a radiator according to various embodiments of the present disclosure.

Referring to FIG. 4, a cover 400 may be at least part of an internal cover or an external cover. At least part of the cover 400 (e.g., a section indicated by reference number 410), may be made of a conductive material. As shown in FIG. 4, the conductive section 410 may form a slit 420 shaped as a rectangle and of which a portion 411 is open. The cover 400 may also arrange at least two feeding points in the conductive section 410 so that a path through which current flows may be formed along the slit 420. For example, the two feeding points are arranged in such a way that the first feeding point 431 is located adjacent to the split portion 421 of the slit 420 and the second feeding point 432 is located adjacent to the connected portion 422 of the slit 420. For example, when current is supplied to the first feeding point 431, a first current path 441 may be formed in the conductive section 410.

In an embodiment, the cover 400 may be used as a radiator of a multiple antenna apparatus. For example, the conductive section 410 may be configured in such a way that another feeding points, e.g., a third feeding point 433 and a fourth feeding point 434, are further arranged adjacent to the slit 420, in addition to the first and second feeding points 431 and 432. The third and fourth feeding points 433 and 434 form a second current path 422 in the conductive section 410.

Figure 5:
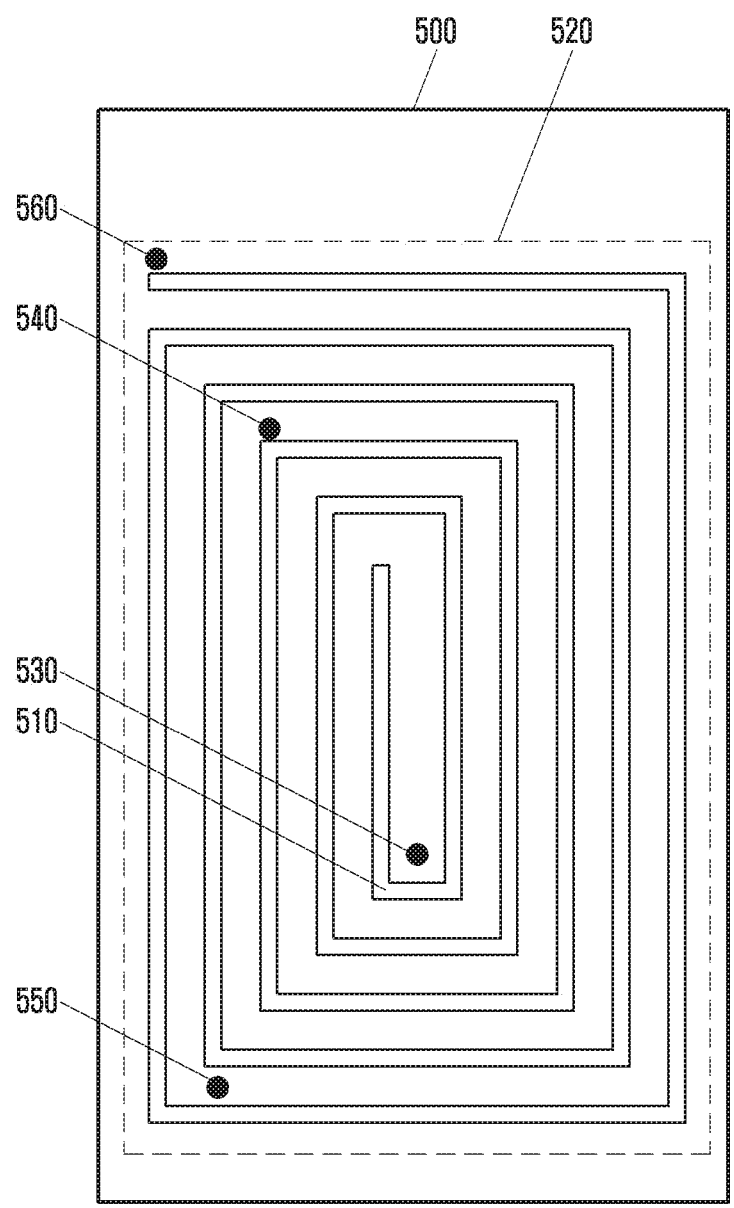
FIGS. 5 and 6 are front views showing covers capable of serving as a radiator for an antenna apparatus or a multiple antenna apparatus according to various embodiments of the present disclosure.
Figure 6:
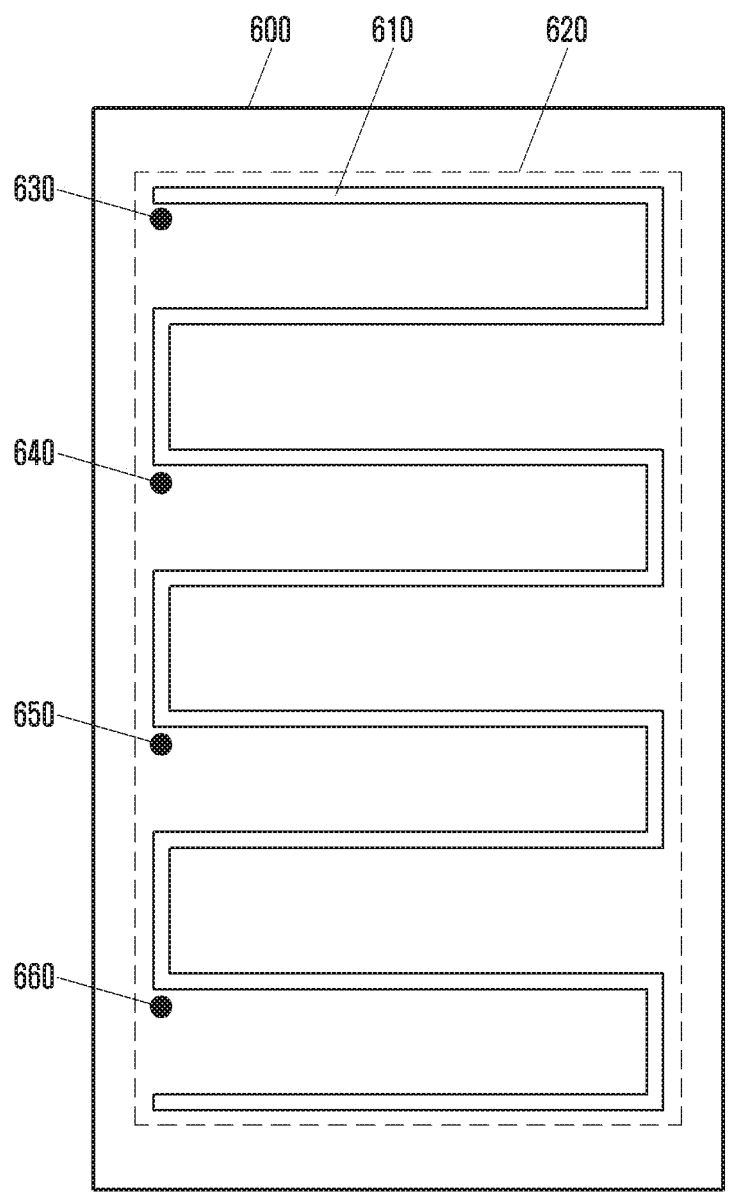

FIGS. 5 and 6 are front views showing covers capable of serving as a radiator for an antenna apparatus or a multiple antenna apparatus according to various embodiments of the present disclosure.

It should be understood that the slit of the cover is not limited to the form in the embodiment shown in FIG. 4, but may vary according to the characteristics or features of an antenna (e.g., the length of a path into which current flows).

Referring to FIG. 5, a slit 510 may be formed as a spiral shape in the conductive section 520 of the cover 500. The cover 500 may be configured in such a way that first, second, third and fourth feeding points 530, 540, 550, and 560 are formed adjacent to the slit 510 in the conductive section 520. The cover 500 is capable of transmitting/receiving electromagnetic waves at a first frequency (e.g., NFC frequency) via a path formed between the first and second feeding points 530 and 540. The cover 500 is capable of receiving electromagnetic waves at a second frequency (e.g., A4WP frequency) via a path formed between the first and third feeding points 530 and 550. The cover 500 is capable of transmitting/receiving electromagnetic waves at a third frequency (e.g., MST frequency) via a path formed between the first and fourth feeding points 530 and 560.

Referring to FIG. 6, a slit 610 may be formed as a zigzag shape in a conductive section 620 of a cover 600. The cover 600 may be configured in such a way that first, second, third and fourth feeding points 630, 640, 650, and 660 are formed adjacent to the slit 610 in the conductive section 620. The cover 600 is capable of transmitting/receiving electromagnetic waves at a first frequency (e.g., NFC frequency) via a path formed between the first and second feeding points 630 and 640. The cover 600 is capable of receiving electromagnetic waves at a second frequency (e.g., A4WP frequency) via a path formed between the first and third feeding points 630 and 650. The cover 600 is capable of transmitting/receiving electromagnetic waves at a third frequency (e.g., MST frequency) via a path formed between the first and fourth feeding points 630 and 660.

Figure 7A:
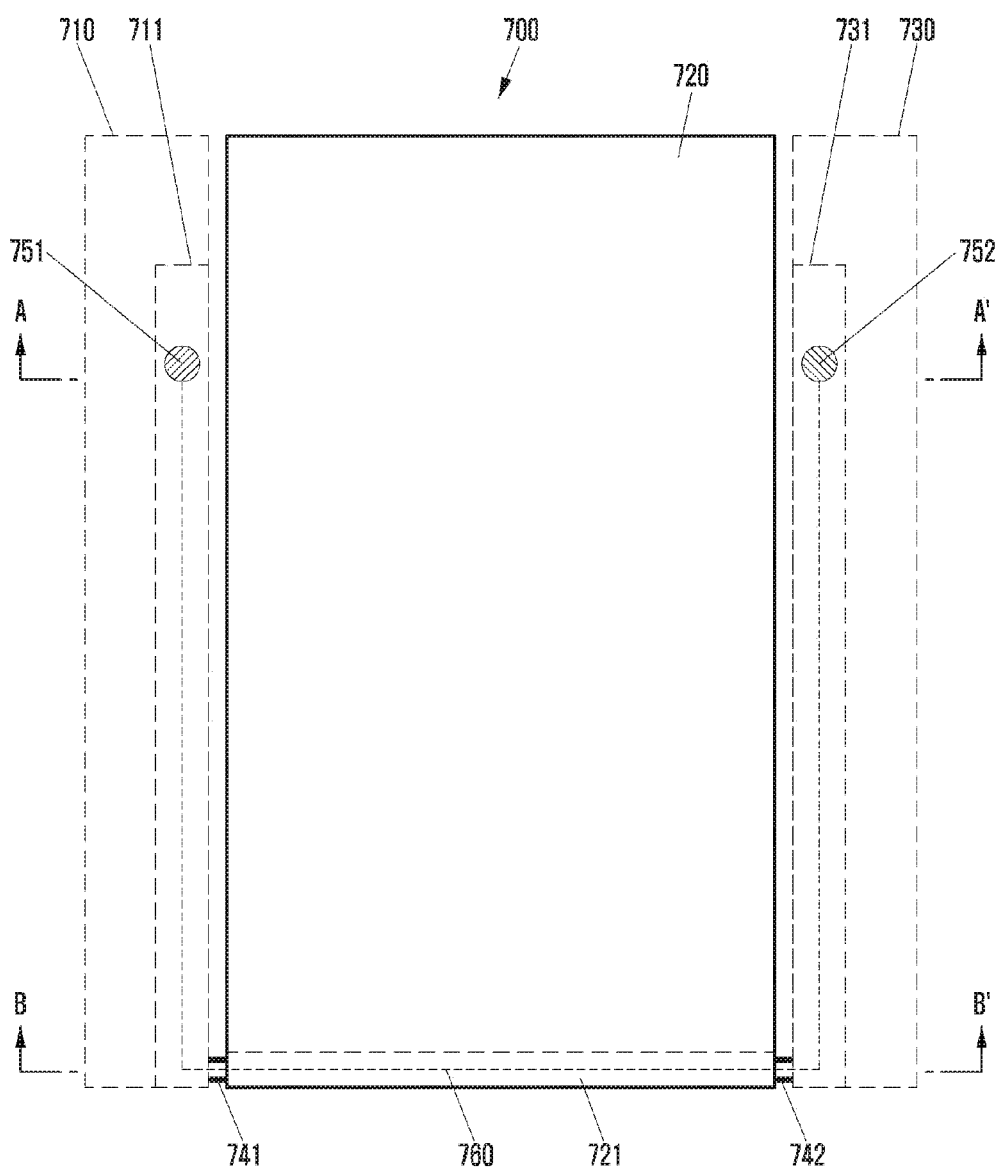
FIGS. 7A to 7C are diagrams showing an antenna apparatus with a number of conductive covers capable of serving as a radiator according to various embodiments of the present disclosure.
Figure 7B:
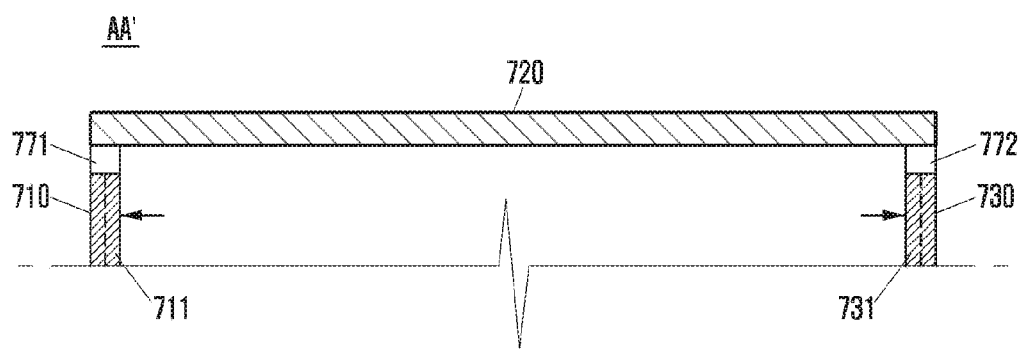
Figure 7C:
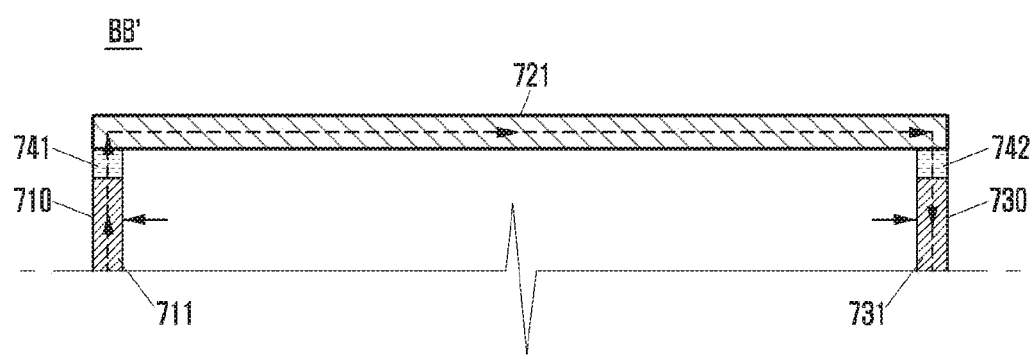

FIGS. 7A to 7C are diagrams showing an antenna apparatus 700 with a number of conductive covers capable of serving as a radiator according to various embodiments of the present disclosure.

More specifically, FIG. 7A is a front view of the antenna apparatus, FIG. 7B is a cross-sectional view of the antenna apparatus, taken along line A-A in FIG. 7A, and FIG. 7C is a cross-sectional view of the antenna apparatus, taken along line B-B' in FIG. 7A.

Referring to FIGS. 7A to 7C, an antenna apparatus 700 is capable of including first, second and third covers 710, 720 and 730. In this case, the first, second and third covers 710, 720 and 730 may also be called first, second and third areas, respectively.

The covers 710, 720 and 730 are parts of the case of the electronic device 100 (e.g., smartphone). For example, the first cover 710 may form part or all of the left side of the smartphone; the second cover 720 may form part or all of the back side of the smartphone; and the third cover 730 may form part or all of the right side of the smartphone. The back side may refer to the rear or the external cover covering the smartphone.

At least part of the first cover 710 (e.g., a section indicated by reference number 711), may be made of a conductive material, and is hereafter called a first conductive section 711. Part of the second cover 720 (e.g., a section indicated by reference number 721), may be made of a conductive material, and is hereafter called a second conductive section 721. Part of the third cover 730 (e.g., a section indicated by reference number 731), may be made of a conductive material, and is hereafter called a third conductive section 731.

The second cover 720 may be electrically connected to the first and third covers 710 and 730. For example, the first and second conductive sections 711 and 721 are electrically connected to each other through a first conductive part 741; and the second and third conductive sections 721 and 731 are electrically connected to each other through a second conductive part 742. The conductive parts 741 and 742 may include at least one of the following: a wire, an inductor, a capacitor, and a resistor. Alternatively, the components 711, 721, 731, 741 and 742 may be implemented as a single conductive member.

Referring to FIG. 7B, a first insulator 771 may be inserted between the first and second covers 710 and 720; and a second insulator 772 may be inserted between the second and third covers 720 and 730. Therefore, the first and second conductive sections 711 and 721 are electrically connected to each other through the first conductive part 741; and the second and third conductive sections 721 and 731 are electrically connected to each other through the second conductive part 742.

The cover may be configured in such a way that feeding points are arranged at least two of the conductive sections 711, 721, and 731, respectively. For example, the cover may be configured in such a way that a first feeding point 751 is arranged at the top of the first conductive section 711 (i.e., at a location opposite the bottom of the first conductive section 711 connected to the first conductive part 741); and a second feeding point 752 is arranged at the top of the third conductive section 731. For example, when current is supplied to the first feeding point 751, a path 760 through which current flows may be formed in the conductive sections 711, 721 and 731. That is, when current is supplied to the first feeding point 751, it flows to the second feeding point 752, along the edge of the first conductive section 711, the first conductive part 741, the edge of the second conductive section 721, the second conductive part 742, and the edge of the third conductive section 731.

As described above, the antenna apparatus is configured in such a way that the conductive covers are electrically connected to each other, so that they can serve as a radiator without forming a slit. The antenna apparatus is called a combined type of antenna apparatus. The combined type of antenna apparatus may also be implemented using various conductive parts in addition to covers.

Figure 8:
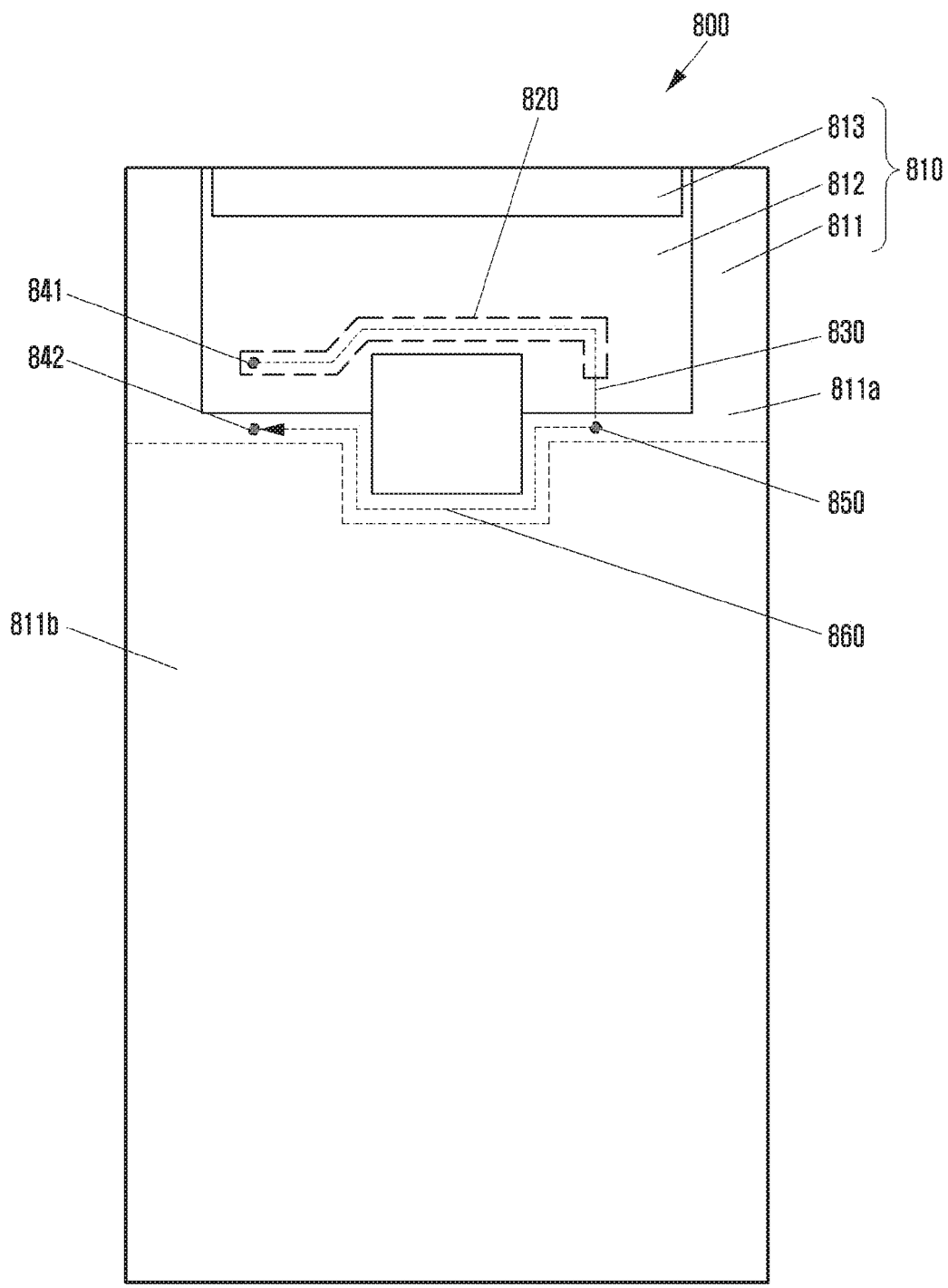
FIG. 8 is a diagram showing an antenna apparatus of a combined type according to various embodiments of the present disclosure.

FIG. 8 is a diagram showing an antenna apparatus of a combined type according to various embodiments of the present disclosure.

Referring to FIG. 8, an antenna apparatus 800 of a combined type is capable of including a cover 810, and first and second conductive parts 820 and 830.

The cover 810 may be part of the case of the electronic device 100 (e.g., smartphone). For example, the cover 810 may form part or all of the back side of the smartphone. The back side may refer to the rear or the external cover covering the smartphone.

The cover 810 is capable of including first, second and third areas 811, 812 and 813. The first area 811 may be divided into a top area 811a and a bottom area 811b. The top area 811a is made of a conductive material and is thus capable of serving as a radiator. The bottom area 811b is made of a non-conductive material. It should be understood that the top area 811a and the bottom area 811b of the first area 811 may be configured as a single conductive material without being divided. Unlike the first area 811, the second area 812 may be made of a non-conductive material. The third area 813 is made of a conductive material and is thus capable of serving as a radiator.

The first conductive part 820 may be housed in the antenna apparatus 800. For example, the first conductive part 820 is located below the second area 812 made of a non-conductive material and includes an FPCB. Alternatively or additionally, the first conductive part 820 may also include wires formed on the board (e.g., PCB). The first conductive part 820 may be configured in such a way that its one end receives current. That is, the first conductive part 820 may form a first feeding point 841 at its one end. In corresponding to the formation of the first feeding point 841, a second feeding point 842 is formed in the top area 811a. For example, the second feeding point 842 and the first feeding point 841 are arranged symmetrically (e.g., in a top-bottom symmetry with respect to the horizontal direction as shown in FIG. 8), and adjacent to the edge of the top area 811a.

The second conductive part 830 is configured to electrically connect the top area 811a and the first conductive part 820 which are separated from each other in layers. For example, the second conductive part 830 is implemented with a wire or a pin so that it electrically connects one end of the first conductive part 820 to the top area 811a. Therefore, the top area 811a receives current from the first conductive part 820 through the second conductive part 830. For example, the top area 811a may form a connection point 850 at the edge to receive current from the second conductive part 830. The connection point 850 and the second feeding point 842 are arranged symmetrically (e.g., in a left-right symmetry with respect to the vertical direction as shown in FIG. 8), and adjacent to the edge of the top area 811a.

According to the configuration of the antenna apparatus 800, when current is supplied to the first feeding point 841, the current flows to the second feeding point 842, along the first conductive part 820, the second conductive part 830 and the edge of the top area 811a located between the connection point 850 and the second feeding point 842, forming a path 860. Therefore, the antenna apparatus 800 can transmit/receive electromagnetic waves through the path 860.

Figure 9:
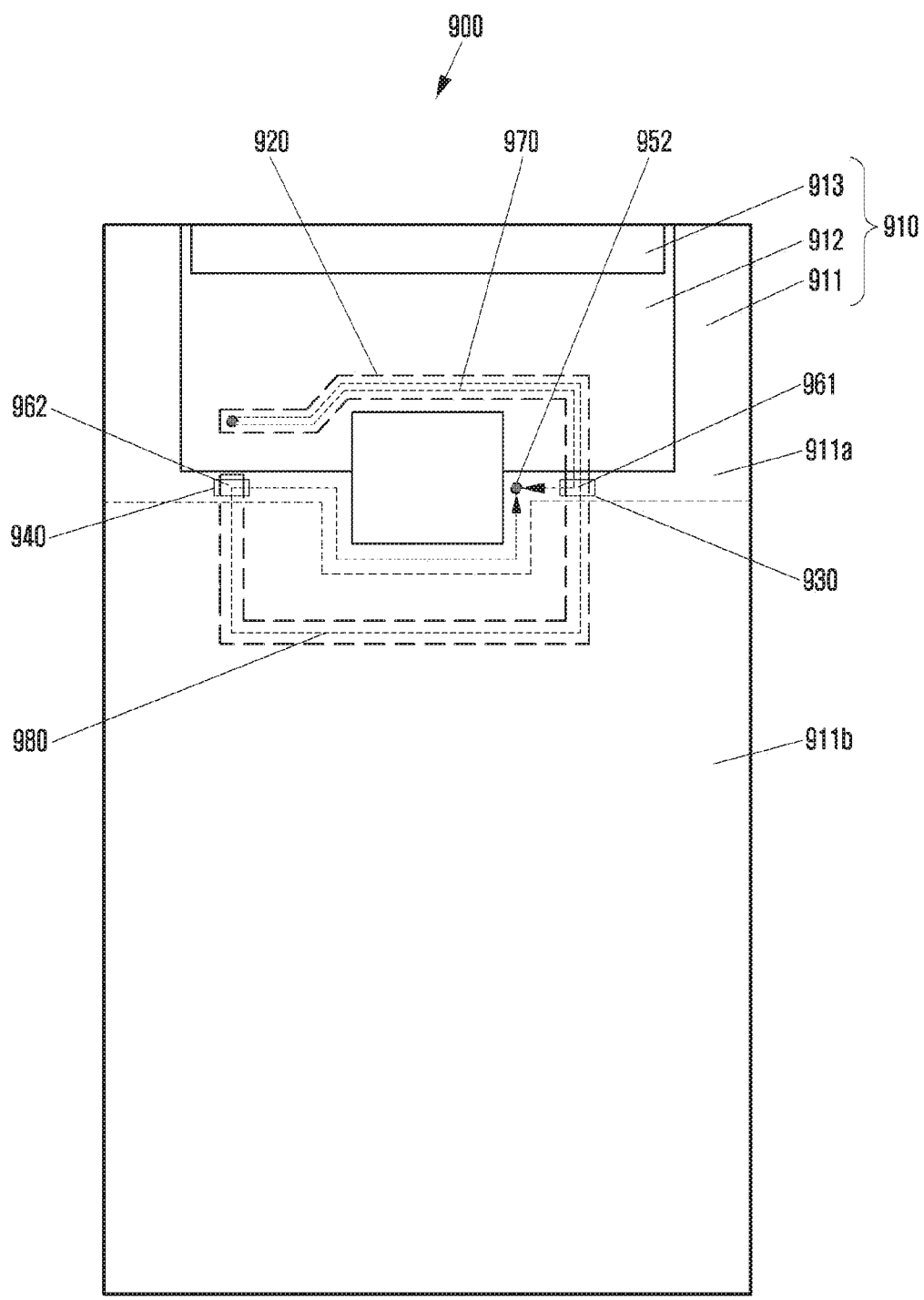
FIG. 9 is a diagram showing an antenna apparatus of a combined type according to various embodiments of the present disclosure.

FIG. 9 is a diagram showing an antenna apparatus of a combined type according to various embodiments of the present disclosure.

Referring to FIG. 9, an antenna apparatus 900 of a combined type is capable of including a cover 910, and first, second and third conductive parts 920, 930 and 940.

The cover 910 may be part of the case of the electronic device 100 (e.g., smartphone). For example, the cover 910 may form part or all of the back side of the smartphone. The back side may refer to the rear or the external cover covering the smartphone.

The cover 910 is capable of including first, second and third areas 911, 912 and 913. The first area 911 may be divided into a top area 911a and a bottom area 911b. The top area 911a is made of a conductive material and is thus capable of serving as a radiator. The bottom area 911b is made of a non-conductive material. Unlike the first area 911, the second area 912 may be made of a non-conductive material. The third area 913 is made of a conductive material and is thus capable of serving as a radiator.

The first conductive part 920 may be housed in the antenna apparatus 900. For example, part of the first conductive part 920 is located below the second area 912 made of a non-conductive material and another part of the first conductive part 920 is located below the bottom area 911b made of a non-conductive material. The first conductive part 920 includes an FPCB. Alternatively or additionally, the first conductive part 920 may also include wires formed on the board (e.g., PCB). The first conductive part 920 may form a first feeding point 951 at one end. In correspondence to the formation of the first feeding point 951, a second feeding point 952 is formed in the top area 911a. For example, the second feeding point 952 is arranged adjacent to the edge of the top area 911a.

The second conductive part 930 is configured to electrically connect the top area 911a and the first conductive part 920 which are separated from each other in layers. For example, the second conductive part 930 is implemented with a wire or a pin so that the second conductive part 930 electrically connects a spot, between one end and the other end of the first conductive part 920, to the top area 911a. The second conductive part 930 may include an electric device (i.e., filter) for selectively passing current at a particular frequency. An example of the electric device is a capacitor configured to pass current at a high frequency which refers to a frequency higher than a low frequency that will be described below. Therefore, the top area 911a receives current from the first conductive part 920 through the second conductive part 930. For example, the top area 911a may form a first connection point 961 at the edge to receive current from the second conductive part 930. The first connection point 961 and the second feeding point 952 are arranged symmetrically (e.g., in a left-right symmetry with respect to the vertical direction as shown in FIG. 9), and adjacent to the edge of the top area 911a.

The third conductive part 940 is configured to electrically connect the top area 911a and the first conductive part 920 which are separated from each other in layers. For example, the third conductive part 940 is implemented with a wire or a pin so that it electrically connects the other end of the first conductive part 920 to the top area 911a. The third conductive part 940 may include an electric device for selectively passing current at a particular frequency. An example of the electric device is an inductor configured to pass current at a low frequency. The top area 911a receives current from the first conductive part 920 through the third conductive part 940. For example, the top area 911a may form a second connection point 962 at the edge to receive current from the third conductive part 940. The second connection point 962 and the second feeding point 952 are arranged symmetrically (e.g., in a left-right symmetry with respect to the vertical direction as shown in FIG. 9), and adjacent to the edge of the top area 911a.

According to the configuration of the antenna apparatus 900, the antenna apparatus 900 is capable of serving as a multiple antenna apparatus. For example, when current of a high frequency is supplied to the first feeding point 951, it flows to the second feeding point 952, along the first conductive part 920, the second conductive part 930 and the edge of the top area 911a located between the first connection point 961 and the second feeding point 952, forming a path 970. Therefore, the antenna apparatus 900 transmits/receives electromagnetic waves of a high frequency through the path 970.

The antenna apparatus 900 is also capable of transmission/reception of electromagnetic waves of a relatively low frequency. For example, when current of a low frequency is supplied to the first feeding point 951, it flows to the second feeding point 952, along the first conductive part 920, the second conductive part 930 and the edge of the top area 911a located between the second connection point 962 and the second feeding point 952, forming a path 980. Therefore, the antenna apparatus 900 transmits/receives electromagnetic waves of a low frequency through the path 980.

Figure 10:
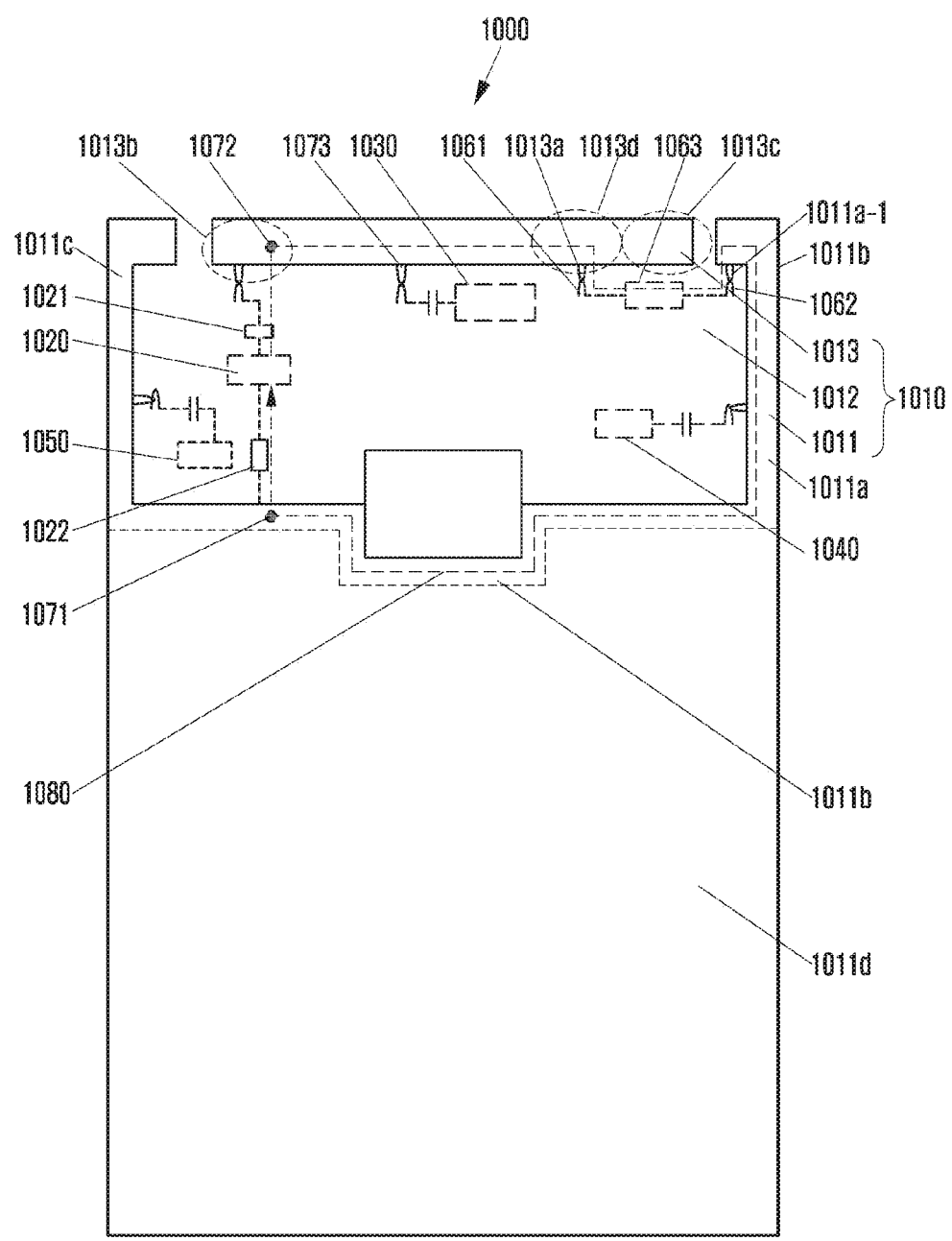
FIG. 10 is a diagram showing a multiple antenna apparatus of a combined type according to various embodiments of the present disclosure.

FIG. 10 is a diagram showing a multiple antenna apparatus of a combined type according to various embodiments of the present disclosure.

Referring to FIG. 10, an antenna apparatus 1000 of a combined type is capable of including a cover 1010, and a number of communication modules 1020, 1030, 1040, and 1050.

The cover 1010 may be part of the case of the electronic device 100 (e.g., smartphone). For example, the cover 1010 may form part or all of the back side of the smartphone. The back side may refer to the rear or the external cover covering the smartphone.

The cover 1010 is capable of including first, second and third areas 1011, 1012 and 1013.

The first area 1011 may be divided into a top area (1011a, 1011b, and 1011c) and a bottom area 1011d. The top area may be formed with a conductive material. The bottom area 1011d may be formed with a non-conductive material. The first area 1011 may also be formed with a single conductive material, without distinguishing between the top and bottom areas. The first area 1011 may form a first feeding point 1071. For example, the first feeding point 1071 may be arranged adjacent to the edge of the second section 1011b.

The second area 1012 may be made of a non-conductive material, compared with the top area of the first area 1011 made of a conductive material. The first section 1011a and the third section 1011c of the top area are located at the left and right of the second area 1012, respectively. The third area 1013 and the second section 1011b of the top area are located at the top and bottom of the second area 1012, respectively.

The third area 1013 may be made of a conductive material. The third area 1013 is electrically connected to the first area 1011. For example, the antenna apparatus 1000 may further include a conductive part 1060 configured to electrically connect the third area 1013 to the first section 1011a. The conductive part 1060 may include first and second pins 1061 and 1062, and a filter 1063 configured to selectively pass current of a particular frequency. The filter 1063 includes an inductor. The inductor is configured to allow current to flow for near-field communication (e.g., wireless charging, NFC, MST, and the like) between the third area 1013 and the first section 1011a. The inductor may have an inductance of 100 nH. Both terminals of the filter 1063 are connected to the first and second pins 1061 and 1062. The first and second pins 1061 and 1062 are connected to a contact 1013a (e.g., flange) of the third area 1013 and a contact 1011a_1 of the first section 1011a, respectively. Although it is not shown, the pins 1061 and 1062 and the filter 1063 may be placed on dielectric substances formed on a PCB, for example.

The third area 1013 may form a second feeding point 1072. For example, the second feeding point 1072 and the first feeding point 1071 are arranged symmetrically (e.g., in a top-bottom symmetry with respect to the horizontal direction as shown in FIG. 10), and adjacent to the edge of one end 1013b of the third area 1013.

A number of communication modules 1020, 1030, 1040, and 1050 may be housed in the antenna apparatus 1000. For example, the communication modules 1020, 1030, 1040, and 1050 may be formed on a circuit board in the antenna apparatus 1000.

The first communication module 1020 may be implemented with, for example, a near-field communication module. The first communication module 1020 is electrically connected to the first and second feeding points 1071 and 1072. For example, first and second electrodes of the first communication module 1020 are connected to the first and second feeding points 1071 and 1072, respectively. The first and second electrodes of the first communication module 1020 may also be connected to the first and second feeding points 1071 and 1072, through electric devices 1021 and 1022 (e.g., filters including an inductor of inductance of 100 nH), respectively. The first communication module 1020 supplies current to the first feeding point 1071 or the second feeding point 1072 through the electrodes. For example, when current of a near-field frequency is supplied to the second feeding point 1072, the current flows to the first feeding point 1071, along the edge of the third area 1013, the edge of the first section 1011a, and the edge of the second section 1011b, forming a path 1080. Therefore, the antenna apparatus 1000 performs near-field communication through the path 1080.

In an embodiment, the first communication module 1020 may be replaced with a power management module (e.g., power management module 120). In this case, the path 1080 may be used for wireless charging for a battery.

The first section 1011*a*, the third area 1013 and the third section 1011*c* may serve as radiators for the third, second and fourth communication modules 1040, 1030 and 1050, respectively. For example, the third, second and fourth communication modules 1040, 1030 and 1050 may be electrically connected to the first section 1011*a*, the third area 1013 and the third section 1011*c*, through capacitors (or insulators or free space), respectively. When one of the third, second and fourth communication modules 1040, 1030 and 1050 supplies current to the capacitor, the current flows to the corresponding radiator (e.g., the third area 1013 connected to the second communication module 1030) through the capacitor. The radiator converts the received current into electromagnetic waves and emits them.

Figure 17:
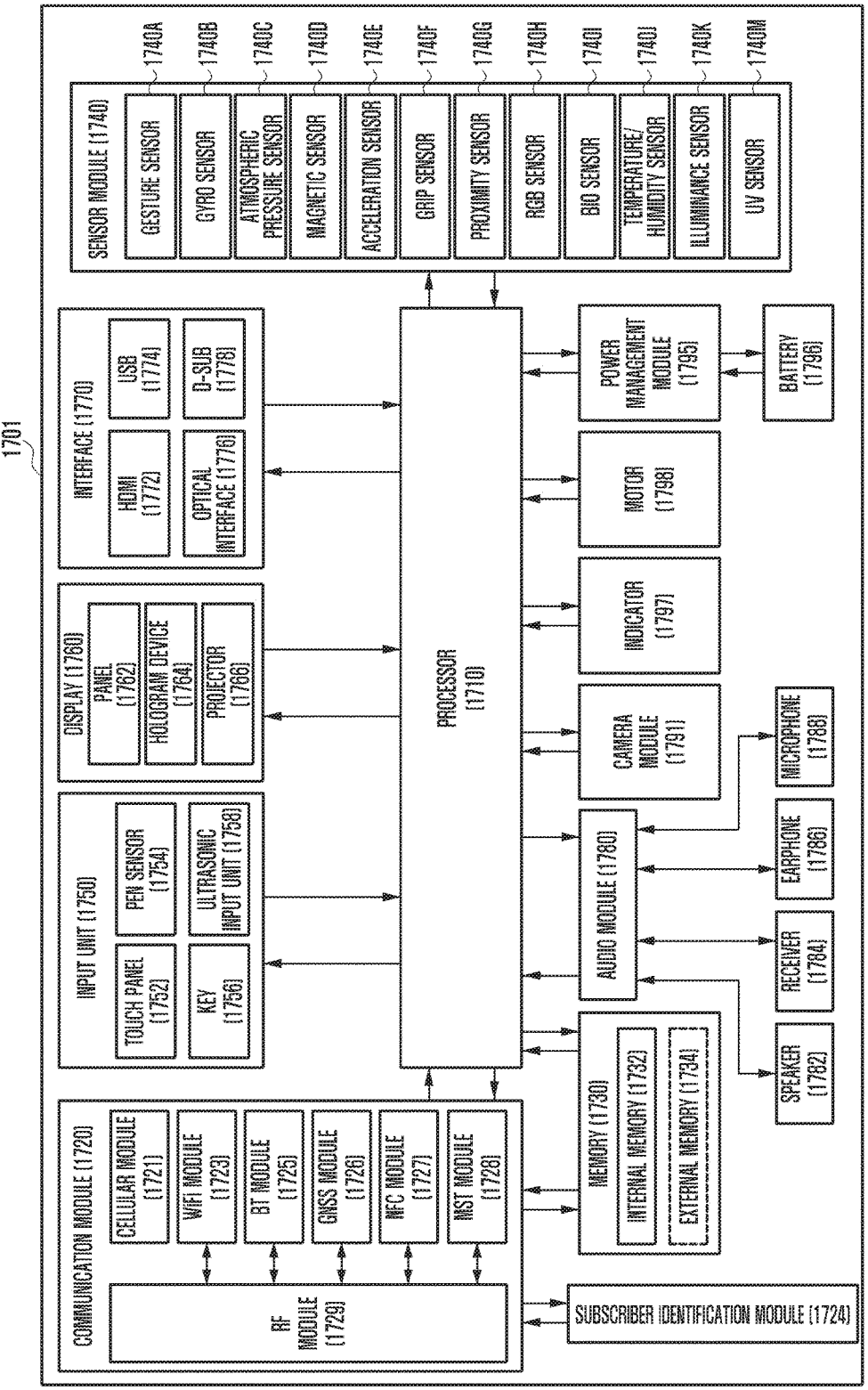
FIG. 17 is a block diagram showing an electronic device according to various embodiments of the present disclosure.

As shown in FIG. 10, the second communication module 1030 may share the third area 1013 with the first communication module 1020 as a radiator. The first communication module 1020 may be used for near-field communication. The second communication module 1030 may be used for non-near field communication, e.g., Wi-Fi, GPS, LTE, FIG. 17 is a block diagram showing an electronic device 1701 according to various embodiments of the present disclosure and the like. In this case, the second communication module 1030 may be connected to the third area 1013, not through the second feeding point 1072, but through another feeding point 1073. The other feeding point 1073 is electrically connected to the inductor of the filter 1063 through the contact 1013*a*. In this case, the inductor may deteriorate the performance of the second communication module 1030. To resolve this problem, the contact 1013*a* may be formed at a place 1013*d* deeper than where the end 1013*c* of the third area 1013 is located, so that the second communication module 1030 is not less susceptible to the filter 1063.

Figure 11:
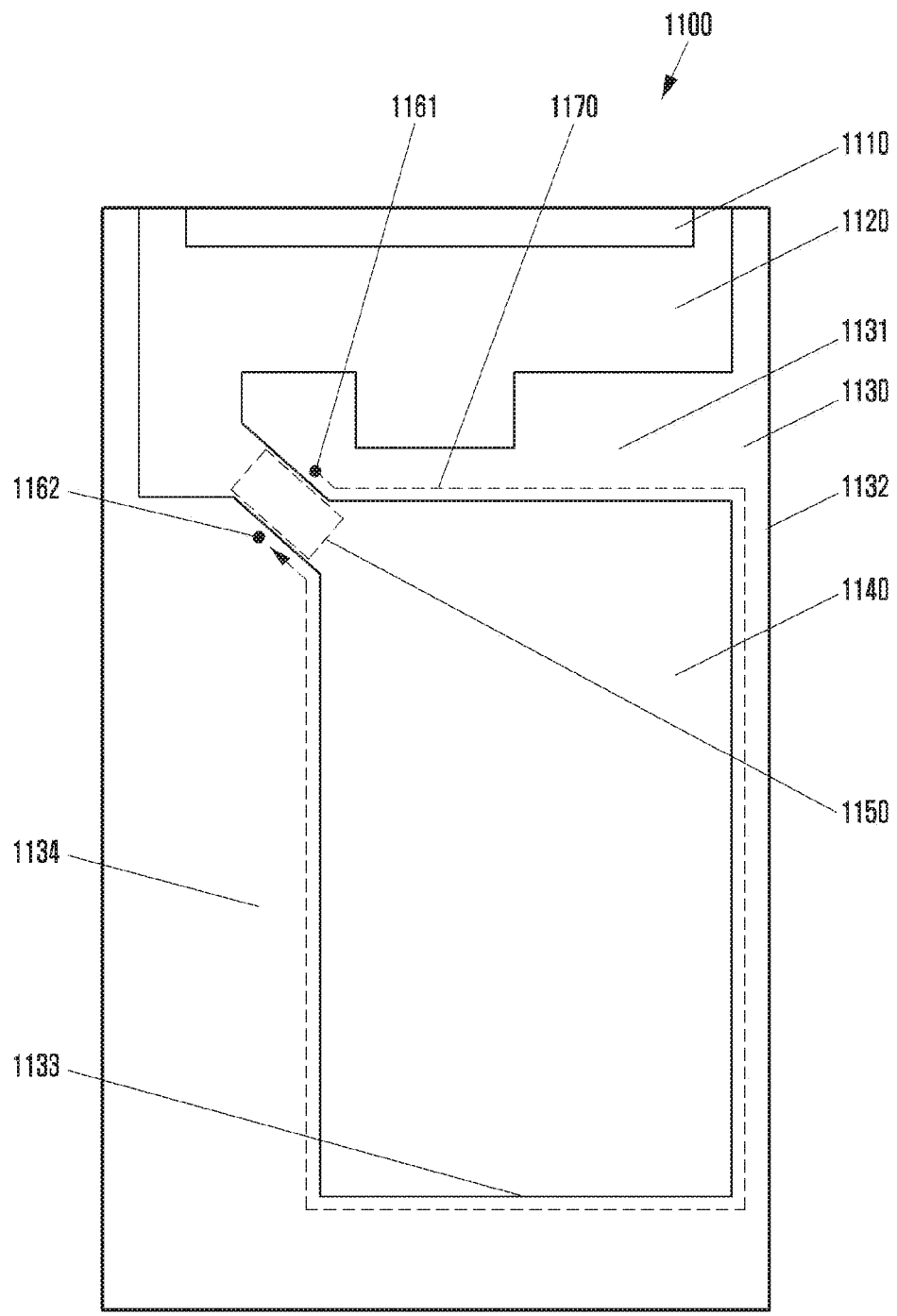
FIG. 11 is a front view showing a cover capable of serving as a radiator according to various embodiments of the present disclosure.

FIG. 11 is a front view showing a cover capable of serving as a radiator according to various embodiments of the present disclosure.

Referring to FIG. 11, a cover 1100 may be part of the case of the electronic device 100 (e.g., smartphone), or part of the rear. The cover 1100 is capable of including first, second, third, fourth and fifth areas 1110, 1120, 1130, 1140, and 1150.

The first area 1110 is made of a conductive material and thus capable of serving as a radiator. The second area 1120 is made of a non-conductive material. The third area 1130 is made of a conductive material. The third area 1130 forms the fourth area 1140 in the inside, surrounding the fourth area 1140. The third area 1130 is configured to include top and bottom sections 1131 and 1133 and right and left sections 1132 and 1134, with respect to the fourth area 1140. The fourth area 1140 is made of a non-conductive material. For example, the fourth area 1140 may be used as a compartment configured to receive a battery. The fifth area 1150 is made of a non-conductive material. The fifth area 1150 may be formed between two of the sections of the third area 1130 (e.g., between the top and left sections 1131 and 1134). As shown in FIG. 11, the embodiment is implemented in such a way that the top and right sections 1131 and 1132 are directly connected to each other; the right and bottom sections 1132 and 1133 are directly connected to each other; the bottom and left sections 1133 and 1134 are directly connected to each other; and the top section 1131 and the left section 1134 are separated from each other by the fifth area 1150, so that the top section 1131 and the left section 1134 are not directly connected to each other.

First and second feeding point 1161 and 1162 may be formed adjacent to the edge of the third area 1130. For example, the first feeding point 1161 in the top section 1131 may be arranged adjacent to the fifth area 1150. The second feeding point 1162 in the left section 1134 may be arranged adjacent to the fifth area 1150. According to the configuration of the cover 1100, the cover 1100 is capable of serving as a radiator without slits. For example, when current is supplied to the first feeding point 1161, the current flows to the second feeding point 1162, along the edge of the top section 1131, the edge of the right section 1132, the edge of the bottom section 1133, and the edge of the left section 1134, forming a path 1170. Therefore, the cover 1100 transmits/receives electromagnetic waves through the path 1170.

Figure 12A:
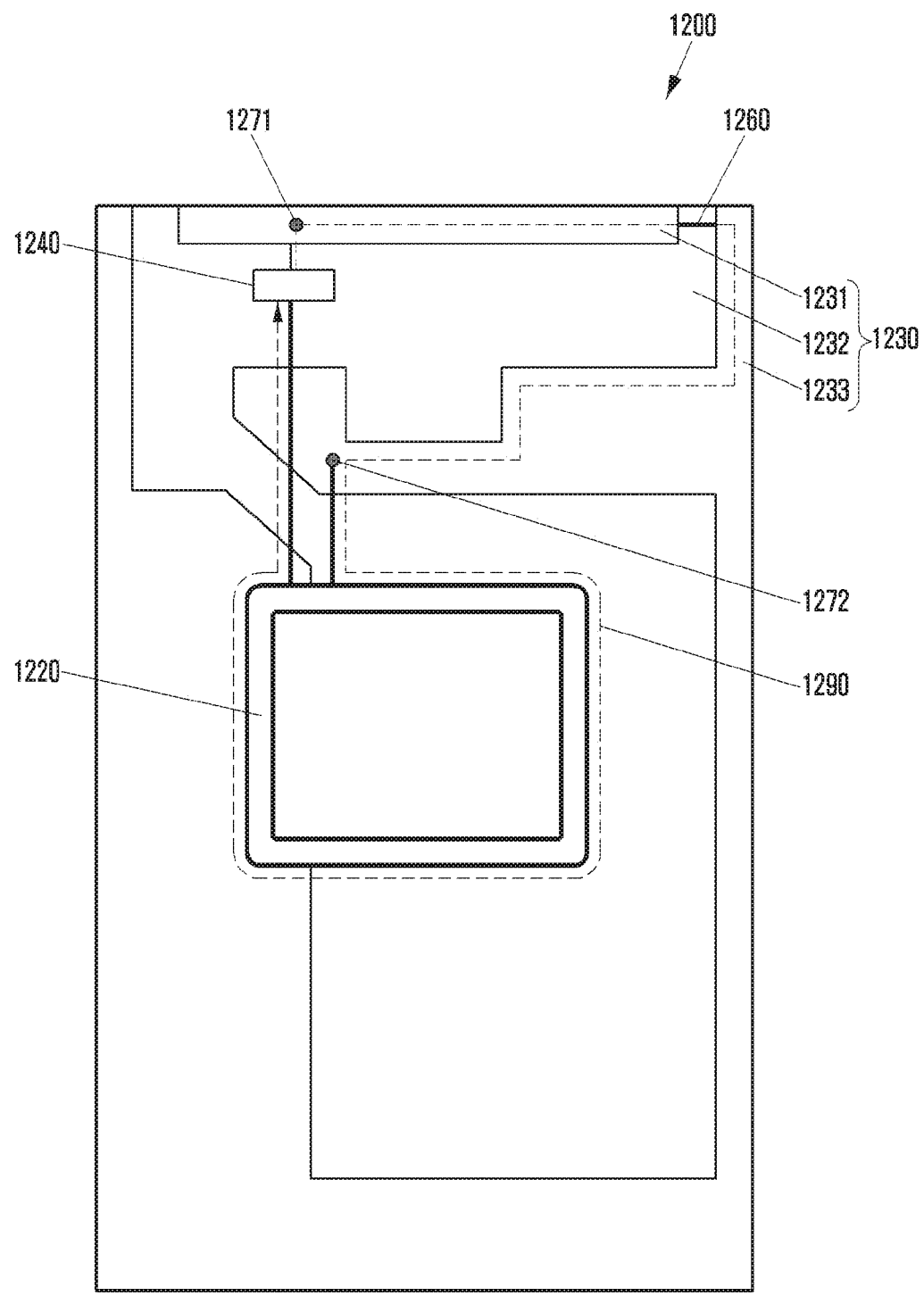
FIGS. 12A and 12B are diagrams showing an antenna apparatus of a combined type according to various embodiments of the present disclosure.
Figure 12B:
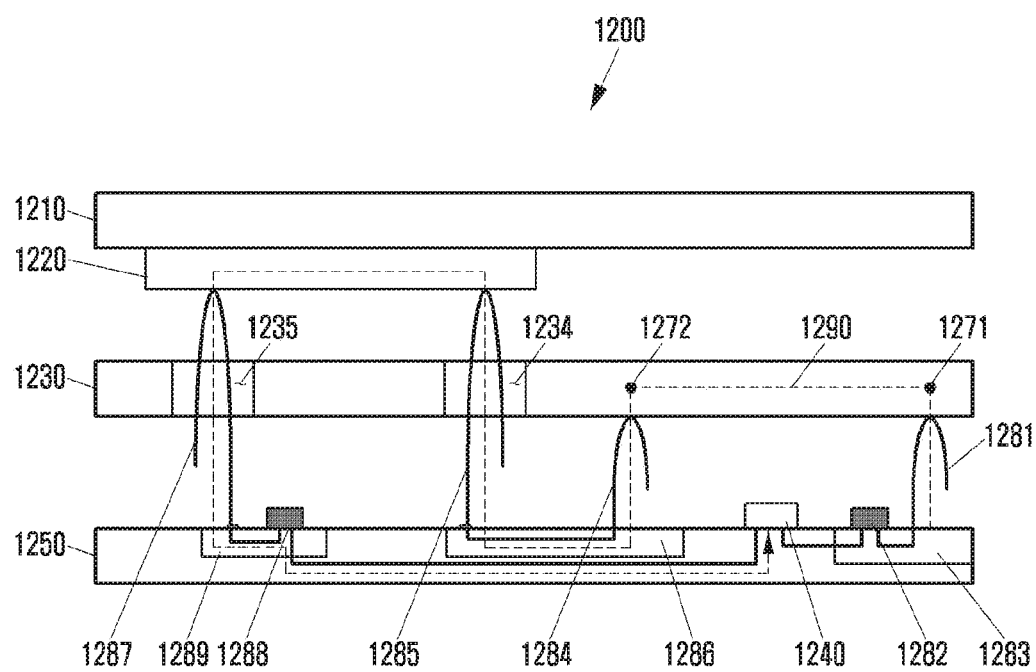

FIGS. 12A and 12B are front and side views showing an antenna apparatus of a combined type according to various embodiments of the present disclosure.

Referring to FIGS. 12A and 12B, an antenna apparatus 1200 of a combined type is capable of including an external cover 1210, a conductive part 1220, an internal cover 1230, a communication module 1240 and a circuit substrate 1250.

The external cover 1210 is made of a non-conductive material. The external cover 1210 may be part of the case of the electronic device 100 (e.g., smartphone), or part of the cover of the smartphone.

The conductive part 1220 is attached to the lower surface of the external cover 1210, and includes wires (e.g., an FPCB with spirally wound coils).

The internal cover 1230 is capable of including first, second and third areas 1231, 1232, and 1233. The first area 1231 is made of a conductive material. The second area 1232 is made of a non-conductive material. The third area 1233 is made of a conductive material. The third area 1233 is electrically connected to the first area 1231. For example, the antenna apparatus 1200 may further include a conductive part 1260 configured to electrically connect one end of the first area 1231 to the third area 1233. The conductive part 1260 is implemented with a wire, a pin, and the like. The conductive part 1260 may further include a filter configured to selectively pass current of a particular frequency. The first area 1231 may form a first feeding point 1271 at the edge of the other end. In correspondence to the formation of the first feeding point 1271, the third area 1233 may form a second feeding point 1272 at its edge.

The first feeding point 1271 may be electrically connected to a first electrode of the communication module 1240 mounted on the circuit substrate 1250. To this end, the antenna apparatus 1200 may further include a first connection terminal 1281 (e.g., a pin); an electric shock preventing capacitor 1282 configured to electrically connect the first connection terminal 1281 to the communication module 1240; and a dielectric substance 1283 on which the first connection terminal 1281 and the electric shock preventing capacitor 1282 are mounted. As one end of the first connection terminal 1281 is attached to the first dielectric substance 1283 of the circuit substrate 1250, it is connected to the first electrode of the communication module 1240 through the capacitor 1282. The other end of the first connection terminal 1281 is connected to the first feeding point 1271 via path 1290.

The antenna apparatus 1200 may further include second and third connection terminals 1284 and 1285. One end of the second connection terminal 1284 and one end of the third connection terminal 1285 are attached to a second dielectric substance 1286 of the circuit substrate 1250, and electrically connected to each other through a wire. The other end of the second connection terminal 1284 contacts the second feeding point 1272. The other end of the third connection terminal 1285 is exposed through a first through-hole 1234 formed in the internal cover 1230 and is connected to the first electrode of the conductive part 1220.

The second electrode of the conductive part 1220 is electrically connected to the second electrode of the communication module 1240. To this end, the antenna apparatus 1200 may further include a fourth connection terminal 1287 (e.g., a resilient pin). One end of the third connection terminal 1285 is attached to a third dielectric substance 1289 of the circuit substrate 1250, and is electrically connected to the second electrode of the communication module 1240 through a capacitor 1288. The other end of the third connection terminal 1285 is exposed through a second through-hole 1235 formed in the internal cover 1230 and is connected to the second electrode of the conductive part 1220.

According to the configuration of the antenna apparatus 1200, when the communication module 1240 supplies current to the first feeding point 1271, the current flows to the second feeding point 1272, along the edge of the first area 1231 and the edge of the third area 1233; and the current also flows from the second feeding point 1272 to the communication module 1240 through the conductive part 1220, forming a path 1240. Therefore, the antenna apparatus 1200 can transmit/receive electromagnetic waves through the path 1240.

The first area 1231 may also serve as a radiator for other communication modules as well as the communication module 1240. For example, a cellular communication module may share the first area 1231 with the communication module 1240 as a radiator.

Figure 13:
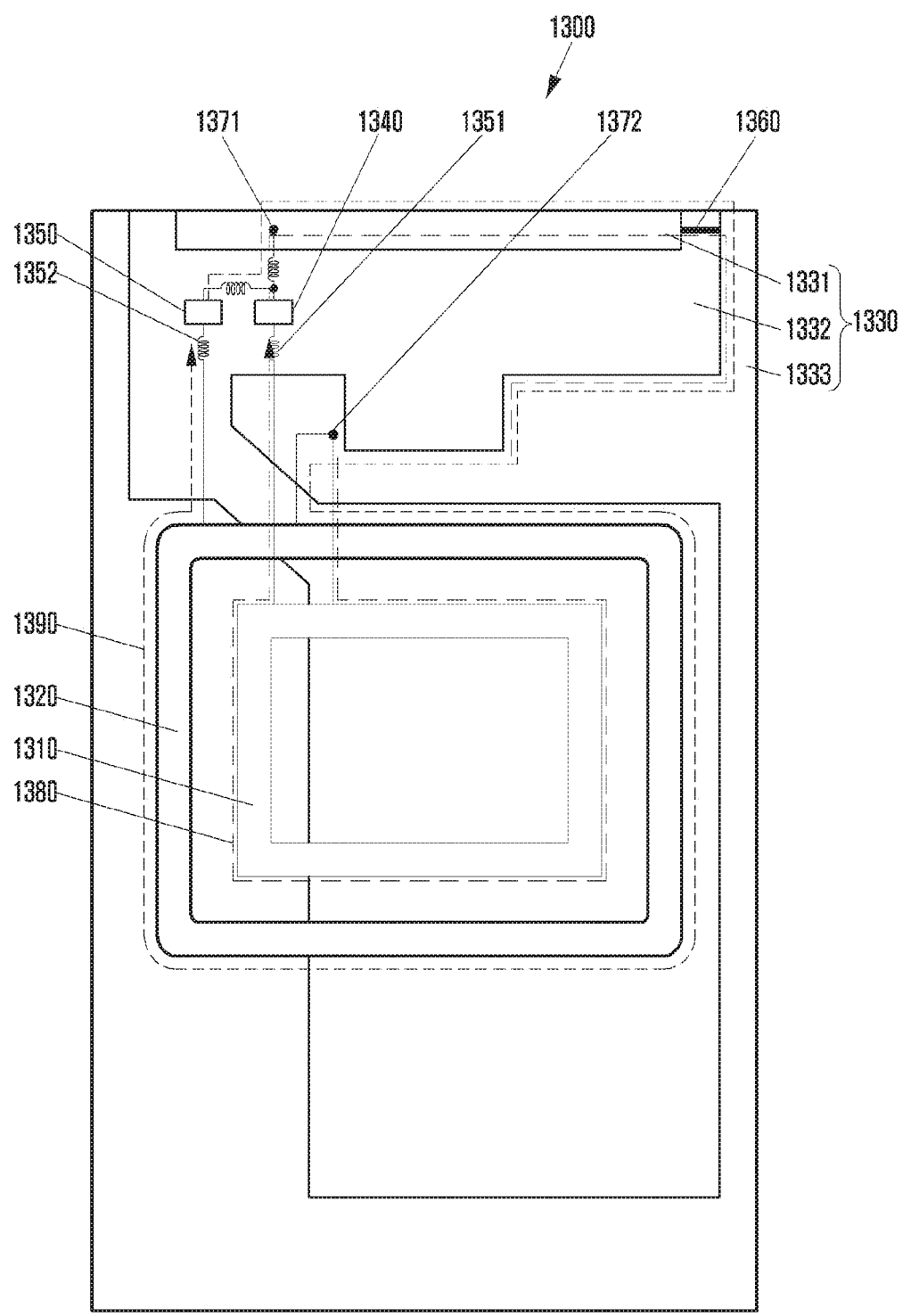
FIG. 13 is a diagram showing a multiple antenna apparatus of a combined type according to various embodiments of the present disclosure.

FIG. 13 is a diagram showing a multiple antenna apparatus of a combined type according to various embodiments of the present disclosure.

Referring to FIG. 13, an antenna apparatus 1300 is capable of including first and second conductive parts 1310 and 1320, a cover 1330, and first and second communication modules 1340 and 1350.

Although it is not shown, the antenna apparatus 1300 may further include an external cover configured to protect the cover 1330. The external cover is made of a non-conductive material. The external cover may be part of the case of the electronic device 100 (e.g., smartphone), or part of the cover of the smartphone. Although it is not shown, the antenna apparatus 1300 may further include a circuit substrate which is located below the cover 1330 and on which the first and second communication module 1340 and 1350 are mounted.

The individual, first and second conductive parts 1310 and 1320 are attached to the lower surface of the external cover, and include FPCBs with spirally wound coils. The spirally wound coils may differ in length from each other.

The cover 1330 may be part of the case of the electronic device 100 (e.g., smartphone), e.g., part of the rear.

The cover 1330 is capable of including first, second and third areas 1331, 1332, and 1333. The first area 1331 is made of a conductive material. The second area 1332 is made of a non-conductive material. The third area 1333 is made of a conductive material. The third area 1333 is electrically connected to the first area 1331. For example, the antenna apparatus 1300 may further include a third conductive part 1360 configured to electrically connect one end of the first area 1331 to the third area 1333. The third conductive part 1360 is implemented with a wire, a pin, and the like. The third conductive part 1360 may further include an electric device configured to selectively pass current of a particular frequency. The first area 1331 may form a first feeding point 1371 at the edge of the other end. In correspondence to the formation of the first feeding point 1371, the third area 1333 may form a second feeding point 1372 at its edge.

The first feeding point 1371 may be electrically connected to a first electrode of the first communication module 1340 and a first electrode of the second communication module 1350. To this end, the antenna apparatus 1300 may further include a first connection terminal (not shown) (e.g., a pin). As one end of the first connection terminal is attached to the circuit substrate, the first connection terminal is connected to the first electrode of the first communication module 1340 and the first electrode of the second communication module 1350. The other end of the first connection terminal is connected to the first feeding point 1371.

The second feeding point 1372 may be electrically connected to a first electrode of the first conductive part 1310 and a first electrode of the second conductive part 1320. To this end, the antenna apparatus 1300 may further include a second connection terminal (not shown), e.g., a resilient pin. One end of the second connection terminal is attached to the second feeding point 1372. The other end of the second connection terminal is electrically connected to the first electrode of the first conductive part 1310 and the first electrode of the second conductive part 1320.

The second electrode of the first conductive part 1310 is electrically connected to the second electrode of the first communication module 1340. To this end, the antenna apparatus 1300 may further include a third connection terminal (not shown), e.g., a resilient pin. One end of the third connection terminal is attached to the circuit substrate, and is electrically connected to the second electrode of the first communication module 1340. The other end of the third connection terminal is exposed through a first through-hole (not shown) formed in the cover 1330 and is connected to the second electrode of the first conductive part 1310.

The second electrode of the second conductive part 1320 is electrically connected to the second electrode of the second communication module 1350. To this end, the antenna apparatus 1300 may further include a fourth connection terminal (not shown), e.g., a resilient pin. One end of the fourth connection terminal is attached to the circuit substrate, and is electrically connected to the second electrode of the second communication module 1350. The other end of the fourth connection terminal is exposed through a second through-hole (not shown) formed in the cover 1330 and is connected to the second electrode of the second conductive part 1320.

The first and second communication modules 1340 and 1350 may have, at the respective one ends, electric devices configured to selectively pass current of a particular frequency, e.g., a first diplexer 1351 and a second diplexer 1352.

According to the configuration of the antenna apparatus 1300, when the first communication module 1340 supplies current of a first frequency to the first feeding point 1371, the current flows to the second feeding point 1372, along the edge of the first area 1331 and the edge of the third area 1333; and the current also flows from the second feeding point 1372 to the first communication module 1340 through the first conductive part 1310 (by the second diplexer 1352), forming a first path 1380. In contrast, the current of the first frequency does not flow to the second conductive part 1320. Therefore, the antenna apparatus 1300 can transmit/receive electromagnetic waves of the first frequency through the first path 1380.

When the second communication module 1350 supplies current of a second frequency to the first feeding point 1371, the current flows to the second feeding point 1372, along the edge of the first area 1331 and the edge of the third area 1333; and the current also flows from the second feeding point 1372 to the second communication module 1350 through the second conductive part 1320 (by the first diplexer 1351), forming a second path 1390. In contrast, the current of the second frequency does not flow to the first conductive part 1310. Therefore, the antenna apparatus 1300 can transmit/receive electromagnetic waves of the second frequency through the second path 1390.

The first area 1331 may also serve as a radiator for other communication modules as well as the communication module 1340.

Figure 14A:
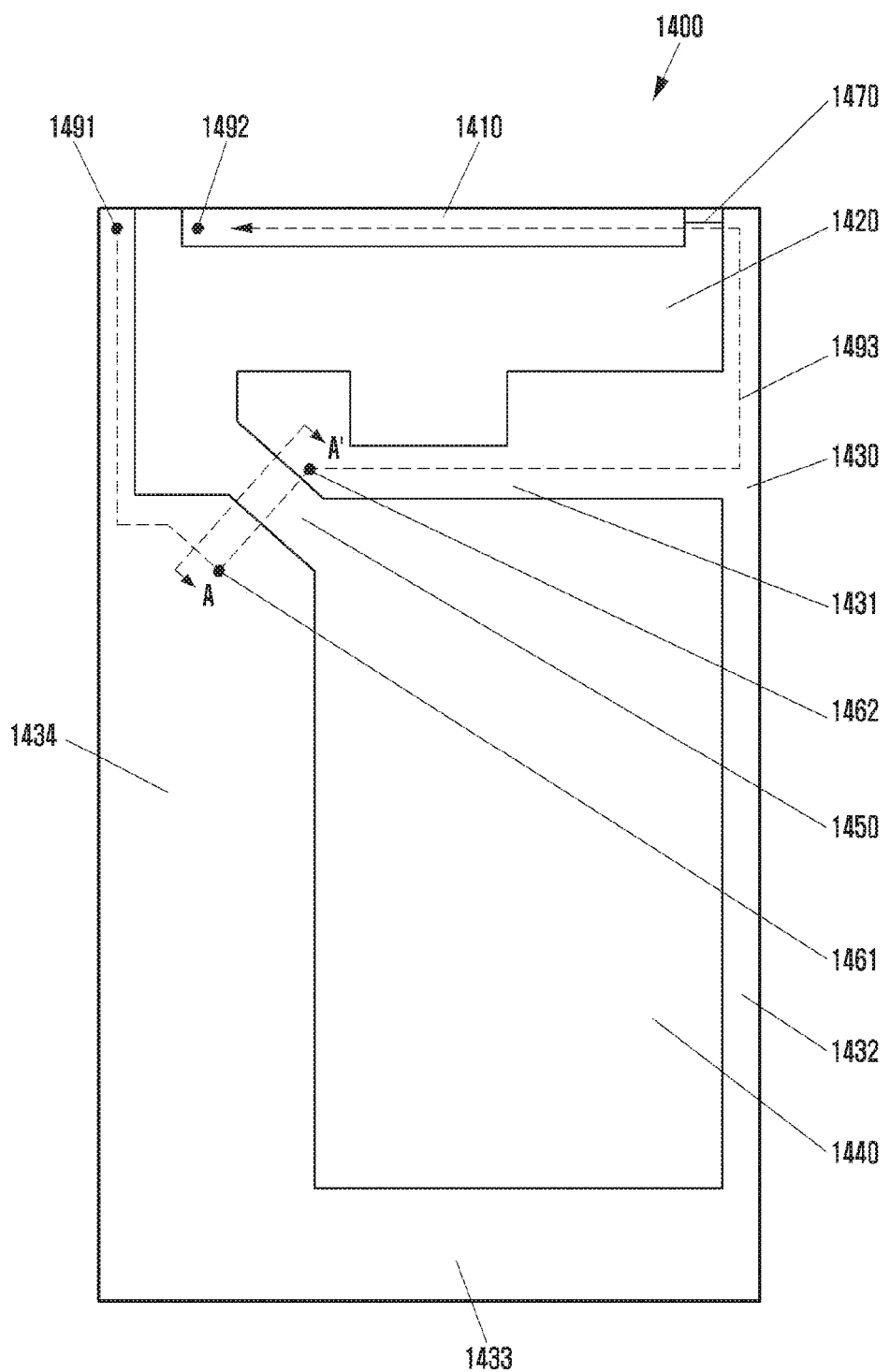
FIGS. 14A to 14C are diagrams showing a multiple antenna apparatus of a combined type according to various embodiments of the present disclosure.
Figure 14B:
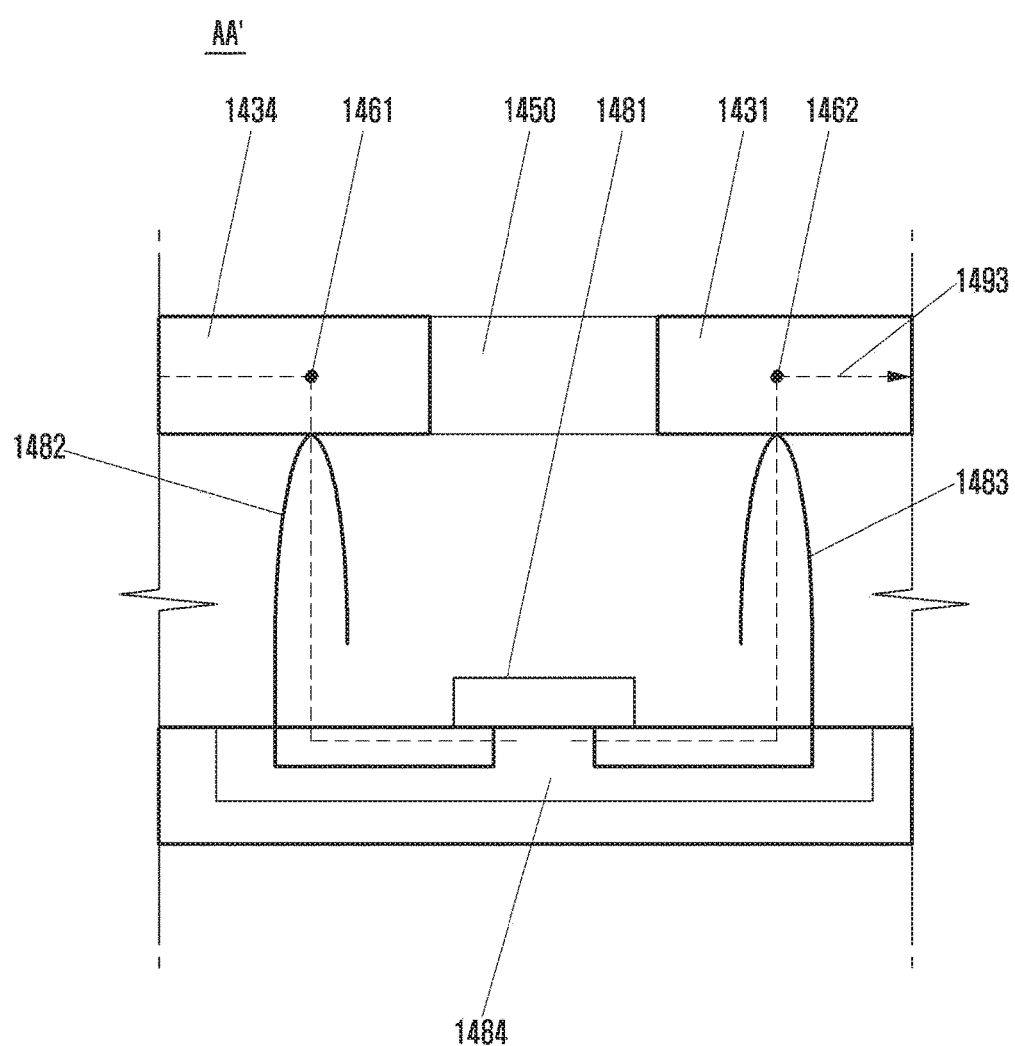
Figure 14C:
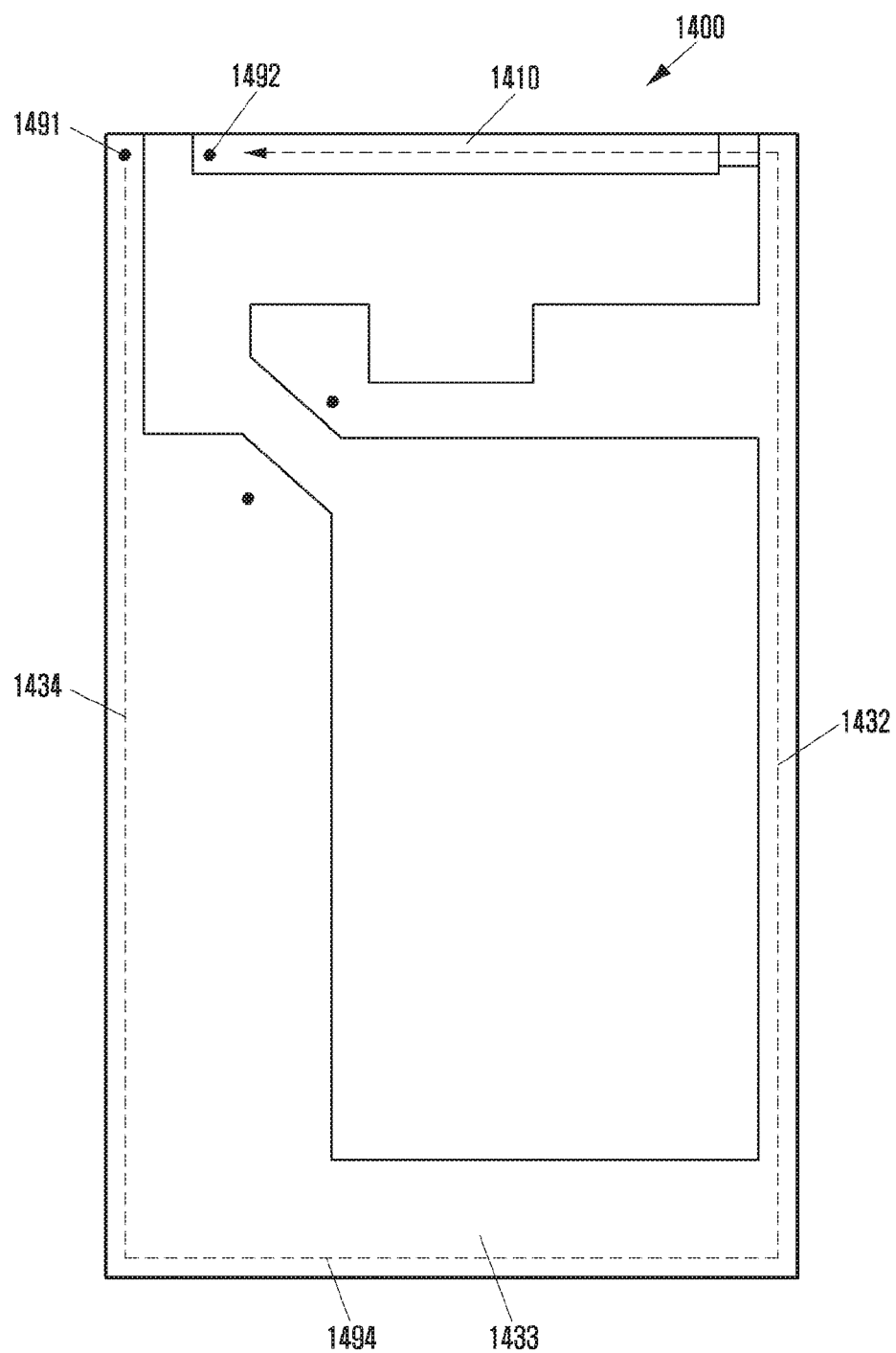

FIGS. 14A to 14C are diagrams showing a multiple antenna apparatus of a combined type according to various embodiments of the present disclosure. More specifically, FIG. 14A is a front view of an antenna apparatus forming a first current path, FIG. 14B is a cross-sectional view of the antenna apparatus, taken along line A-A of a combined type, and FIG. 14C is a front view of the antenna apparatus forming a second current path.

Referring to FIG. 14A, a cover 1400 may be part of the case of the electronic device 100 (e.g., smartphone), e.g., part of the rear. The cover 1400 is capable of including first, second, third, fourth and fifth areas 1410, 1420, 1430, 1440, and 1450.

The first area 1410 is made of a conductive material and thus capable of serving as a radiator. The second area 4120 is made of a non-conductive material. The third area 1430 is made of a conductive material. The third area 1430 forms the fourth area 1440 in the inside, surrounding the fourth area 1440. The third area 1430 are configured to include top and bottom sections 1431 and 1433 and right and left sections 1432 and 1434, with respect to the fourth area 1440. The fourth area 1440 is made of a non-conductive material. For example, the fourth area 1440 may be used as a compartment configured to receive a battery. The fifth area 1450 is made of a non-conductive material. The fifth area 1450 may be formed between two of the sections of the third area 1430, (e.g., between the top and left sections 1431 and 1434). As shown in FIG. 14, the embodiment is implemented in such a way that the top and right sections 1431 and 1432 are directly connected to each other; the right and bottom sections 1432 and 1433 are directly connected to each other; the bottom and left sections 1433 and 1434 are directly connected to each other; and the top section 1431 and the left section 1434 are separated from each other by the fifth area 1450, so that the top section 1431 and the left section 1434 are not directly connected to each other.

The first and second feeding point 1461 and 1462 may be formed adjacent to the edge of the third area 1430. For example, the second feeding point 1462 in the edge of the top section 1431 may be arranged adjacent to the fifth area 1450. The first feeding point 1461 in the edge of the left section 1434 may be arranged adjacent to the fifth area 1450.

The electronic device may further include a conductive part 1470 to electrically connect the first area 1410 to the third area 1430. The conductive part 1470 is implemented with a wire, a pin, and the like. The conductive part 1470 may include a filter configured to selectively pass current of a particular frequency. For example, the filter passes current to perform near-field communication (e.g., wireless charging, NFC, MST, and the like), but does not pass current for non-near field communication (e.g., Wi-Fi, GPS, LTE, and the like).

Referring to FIG. 14B, the electronic device may further include a switch 1481, and first and second connection terminals 1482 and 1483. The switch 1481 and the first and second connection terminals 1482 and 1483 may be attached to a dielectric substance 1484 of a PCB. Both terminals of the switch 1481 are connected to one ends of the first and second connection terminals 1482 and 1483, respectively. The other end of the first connection terminal 1482 contacts a first feeding point 1461. The other end of the second connection terminal 1483 contacts a second feeding point 1462.

The switch 1481 electrically connects/disconnects between the first and second connection terminals 1482 and 1483. The connection/disconnection of the switch may be controlled by a communication module, an AP, and the like. For example, in a state where the switch 1481 is switched to an ON state (i.e., both ends of the switch 1481 are connected), when current is supplied to a third feeding point 1491 formed on the upper end of the left section 1434, the current flows to a fourth feeding point 1492 formed in the first section 1410, along the first feeding point 1461, the switch 1481, the second feeding point 1462, the top section 1431, the upper end of the right section 1432, and the conductive part 1470, forming a first current path 1493. Therefore, the cover 1400 transmits/receives electromagnetic waves for near-field communication (e.g., NFC and A4WP) through the first current path 1493.

In a state where the switch 1481 is switched to an OFF state (i.e., both ends of the switch 1481 are disconnected), when current is supplied to the third feeding point 1491, the current flows to the fourth feeding point 1492, along the left section 1434, the right section 1432 and the conductive part 1470, forming a second current path 1494, as shown in FIG. 14C. Therefore, the cover 1400 transmits/receives electromagnetic waves for NFC (e.g., MST and WPC) through the second current path 1494.

Figure 15A:
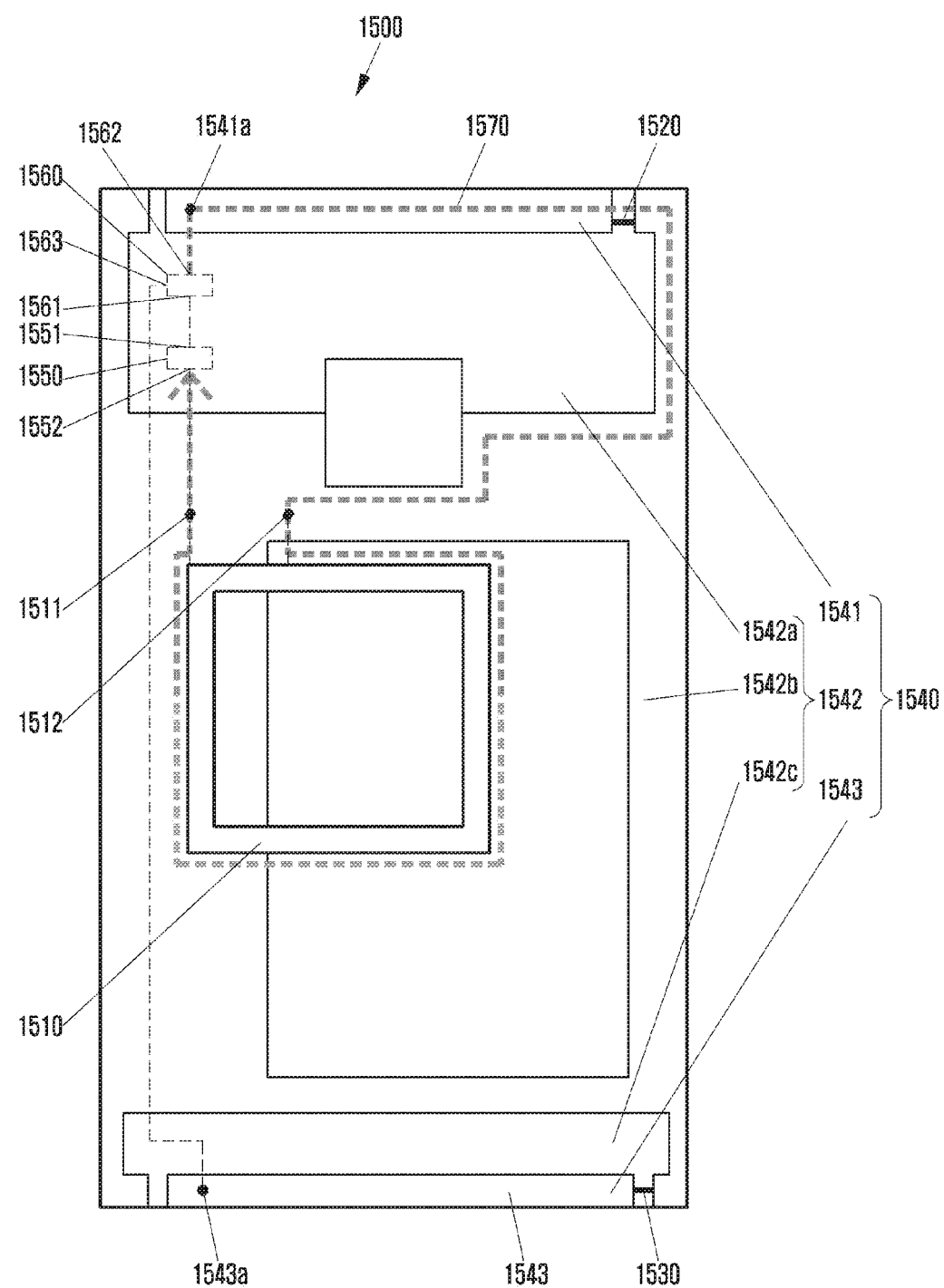
FIGS. 15A and 15B are diagrams showing a multiple antenna apparatus of a combined type according to various embodiments of the present disclosure.
Figure 15B:
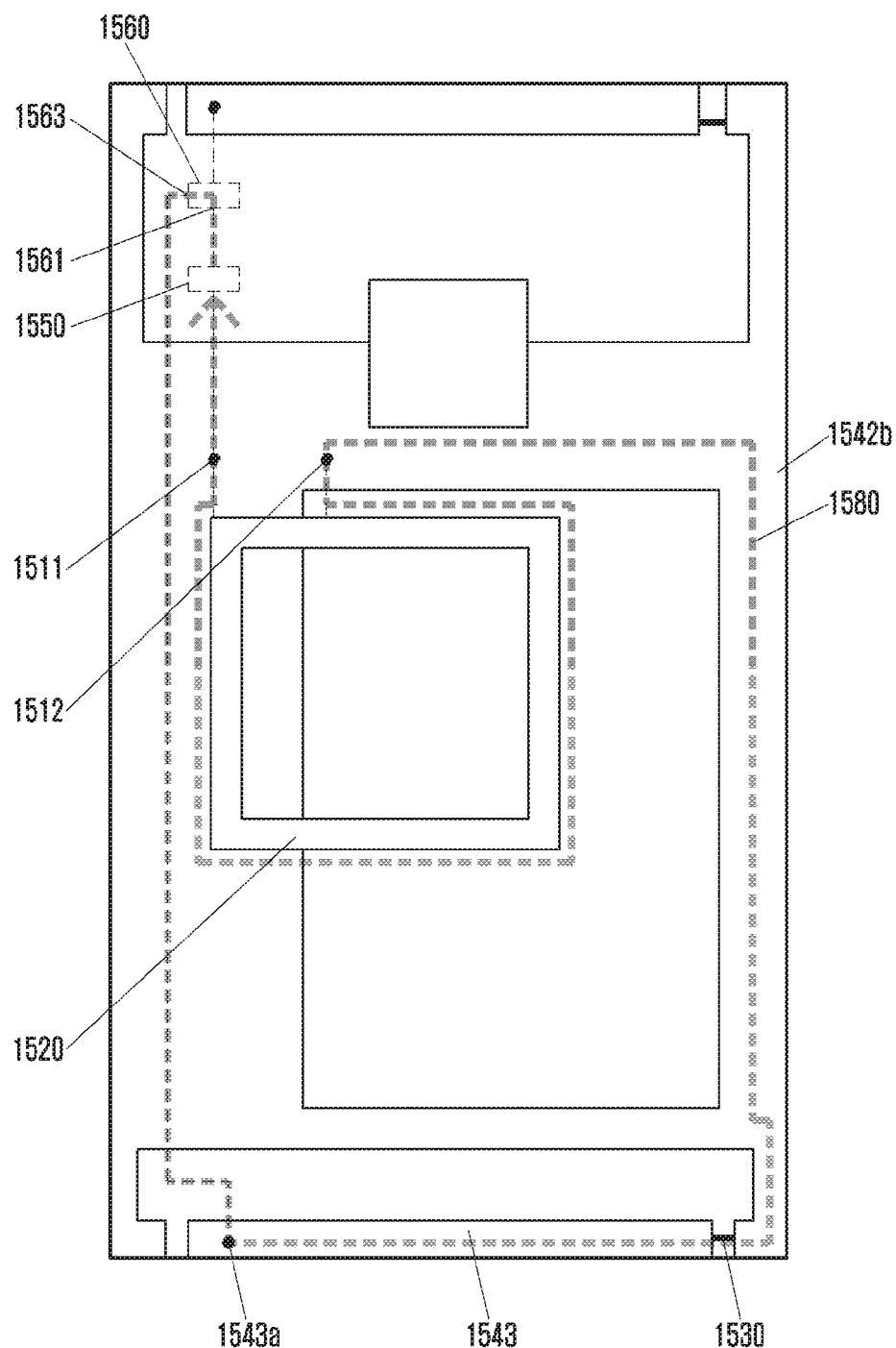

FIGS. 15A and 15B are diagrams showing a multiple antenna apparatus of a combined type according to various embodiments of the present disclosure. More specifically, FIG. 15A is a front view of an antenna apparatus forming a first current path and FIG. 15B is a front view of the antenna apparatus forming a second current path.

Referring to FIG. 15A, an antenna apparatus 1500 is capable of including first, second and third conductive parts 1510, 1520 and 1530, a cover 1540, a communication module 1550 and a switch 1560.

Although it is not shown, the antenna apparatus 1500 may further include an external cover configured to protect the cover 1540. The external cover is made of a non-conductive material. The external cover may be part of the case of the electronic device 100 (e.g., smartphone), for example, part of the cover of the smartphone.

The first conductive part 1510 is attached to the lower surface of the external cover, and includes an FPCB with spirally wound coils.

The cover 1540 may be part of the case of the electronic device 100 (e.g., smartphone), for example, part of the rear.

The cover 1540 is capable of including top, center and bottom sections 1541, 1542 and 1543. The top and bottom sections 1541 and 1543 are made of a conductive material. The center section 1542 is implemented in such a way that one part is made of a conductive material and another part is made of a non-conductive material. For example, the center section 1542 is configured to include a first non-conductive portion 1542*a*, a conductive portion 1542*b* and a second non-conductive portion 1542*c*. As shown in FIGS. 15A and 15C, the top section 1541 and the conductive portion 1542*b* are configured to surround the first non-conductive portion 1542*a*. That is, the left and right of the conductive portion 1542*b* are located at the left and right of the first non-conductive portion 1542*a*, respectively. The top section 1541 and the center of the conductive portion 1542*b* are located at the top and bottom of the first non-conductive portion 1542*a*, respectively. In symmetry to the first non-conductive portion 1542*a*, the second non-conductive portion 1542*c* is surrounded by the bottom section 1543 and the conductive portion 1542*b*.

Although it is not shown, the antenna apparatus 1500 may further include a circuit substrate which is located below the cover 1540 and on which the communication module 1550 and the switch 1560 are mounted. The circuit substrate may include connection modules for connecting a first electrode 1551 of the communication module 1550 to a first electrode 1561 of the switch 1560; a second electrode 1562 of the switch 1560 to a first feeding point 1541*a*; a third electrode 1563 of the switch 1560 to a second feeding point 1543*a*; and a second electrode 1552 of the communication module 1550 to a first electrode 1511 of the first conductive part 1510. The first feeding point 1541*a* is formed in the top section 1541 and the second feeding point 1543*a* is formed in the bottom section 1543. The individual connection modules are configured to include wires, pins, inductors, capacitors, resisters, dielectric substances, and the like, at least part of which may be mounted on the circuit substrate.

The second conductive part 1520 electrically connects the top section 1541 to the conductive portion 1542*b* of the center section 1542. The second conductive part 1520 is implemented with a wire, a pin, and the like. The second conductive part 1520 may include a filter configured to selectively pass current of a particular frequency. The third conductive part 1530 electrically connects the bottom section 1543 to the conductive portion 1542*b* of the center section 1542. The third conductive part 1530 is implemented with a wire, a pin, a filter, and the like. The filters may be configured to pass current to perform near-field communication (e.g., wireless charging, NFC, MST, and the like), but not to pass current for non-near field communication (e.g., Wi-Fi, GPS, LTE, and the like).

The switch 1560 electrically connects the first electrode 1561 to the second electrode 1562 or the third electrode 1563. The selective connection of the switch 1560 may be controlled by the communication module 1550, an AP, and the like.

In a state where the first and second electrodes 1561 and 1562 are connected, when the communication module 1550 supplies current to the first electrode 1561, the current flows to the communication module 1550, along the top section 1541 through the first feeding point 1541*a*; the second conductive part 1520 and the conductive portion 1542*b*; a second electrode 1512 of the first conductive part 1510; and the first electrode 1511 of the first conductive part 1510, forming a first current path 1570. Therefore, the cover 1540 transmits/receives electromagnetic waves for near-field communication (e.g., NFC and A4WP) through the first current path 1570.

Referring to FIG. 15B, in a state where the first and third electrodes 1561 and 1563 are connected, when the communication module 1550 supplies current to the first electrode 1561, the current flows to the communication module 1550, along the bottom section 1543 through the second feeding point 1543*a*; the third conductive part 1530 and the conductive portion 1542*b*; the second electrode 1512 of the first conductive part 1510; and the first electrode 1511 of the first conductive part 1510, forming a second current path 1580. Therefore, the cover 1540 transmits/receives electromagnetic waves for near-field communication (e.g., MST and WPC) through the second current path 1580.

A handheld electronic device may comprise a front cover forming the front of the handheld electronic device; a back cover forming the back of the handheld electronic device; a side member at least partially surrounding a space between the front cover and the back cover; a display module, housed in the space, with a screen area exposed through the front cover; and a ground plate housed in the space. At least part of the side member and the back cover may comprise a conductive material. The handheld electronic device may comprise first and second connection terminals electrically connected to the at least part. The at least part may form at least part of an antenna of the handheld electronic device, and comprise first and second areas which are spaced apart from each other. The first area may be electrically connected to the second area and the first connection terminal. The second area may be electrically connected to the second connection terminal.

The first area may electrically connected to a first communication module and a second communication module of which the frequency differs from that of the first communication module, via the first connection terminal.

The handheld electronic device may further comprise a conductive part configured so that current of the frequency corresponding to the first communication module flows between the first area and the second area; and current of the frequency corresponding to the second communication module does not flow between the first area and the second area.

The conductive part may comprise an inductor.

The back cover may further comprise a third area made of a non-conductive material.

First and second sections of the second area may be located to the left and right of the third area, respectively.

A third section of the second area and the first area may be located to the bottom and top of the third area, respectively.

The first, second and third areas may form at least part of a rear of the handheld electronic device with an antenna; or at least part of an external cover covering the rear.

The back cover may comprise a third area which is located between the first and second areas and physically separated from the first and second areas; and at least part of which is made of a conductive material and electrically connects the first area to the second area.

The third area may form at least part of a rear of the handheld electronic device with an antenna; or at least part of an external cover covering the rear.

The first and second areas may form at least part of the left side member and at least part of the right side member of the handheld electronic device, respectively.

The handheld electronic device may further comprise a first insulator inserted between the first and third areas; a second insulator inserted between the second and third areas; a first conductive part allowing current to flow between the first and third areas; and a second conductive part allowing current to flow between the second and third areas.

The handheld electronic device may further comprise a coil; a third connection terminal connecting the second connection terminal to a first electrode of the coil; and a third connection terminal connecting a second electrode of the coil to a substrate housed in the space.

The first and second areas may form at least part of a rear of the handheld electronic device.

The coil may be attached to a lower surface of the back cover covering the rear.

The handheld electronic device may further comprise first and second coils; third and fourth connection terminals; and a diplexer for allowing current to flow into the first or second coil.

The first and second coils may be connected to the second area as a first electrode of the first coil and a first electrode of the second coil contact the second connection terminal.

A second electrode of the first coil may contact the third connection terminal.

A second electrode of the second coil may contact the fourth connection terminal.

The first and second areas may form at least part of a rear of the handheld electronic device with an antenna.

The first and second coils may be attached to a lower surface of an external cover covering the rear.

The first and second areas may serve as a radiator; and transmit magnetic field signals containing MST data.

A handheld electronic device may comprise a cover at least part of which is made of a conductive material and forms a current path; and first and second connection terminals electrically connected to the at least part of the cover. The at least part of the cover may form at least one slit. The first and second connection terminals may contact a spot, adjacent to the at least one slit, and other different spots, in the at least part of the cover.

The handheld electronic device may further comprise a switch housed in the space, wherein the switch switches on/off the electrical connection between first and second sections in the second area.

A handheld electronic device may comprise a front cover forming the front of the handheld electronic device; a back cover forming the back of the handheld electronic device; a side member at least partially surrounding a space between the front cover and the back cover; a display module, housed in the space, with a screen area exposed through the front cover; and a coil, a switch and a communication module, which are housed in the space. At least part of the side member and/or the back cover may comprise a conductive material. The at least part may form at least part of an antenna of the handheld electronic device, and comprise first, second and third areas which are spaced apart from each other. The communication module may be electrically connected to a first electrode of the switch and the coil. The first area may be electrically connected to a second electrode of the switch and the second area. The third area may electrically connected to a third electrode of the switch and the second area. The first electrode of the switch may be connected to the second or third electrode.

Figure 16:
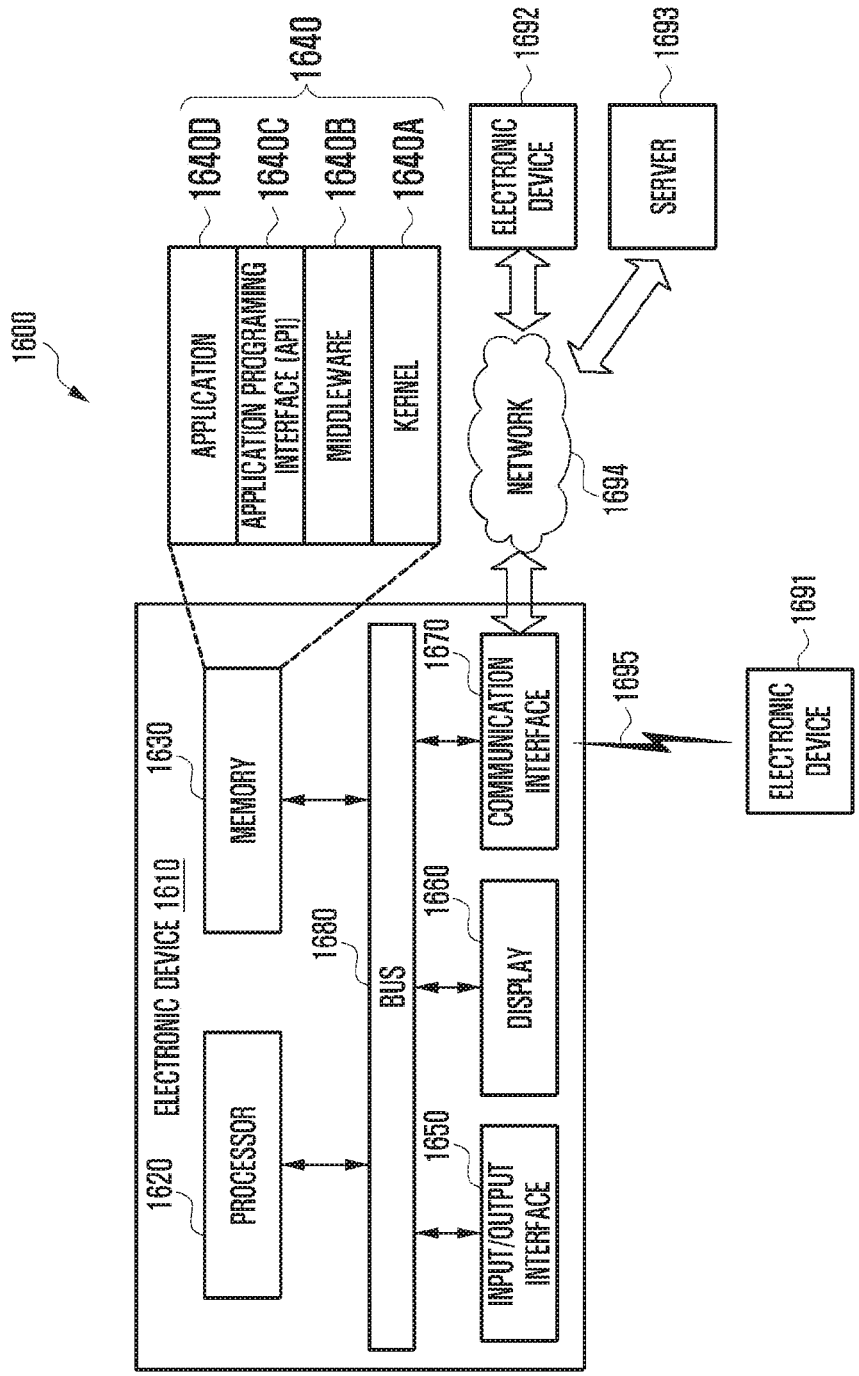
FIG. 16 is a block diagram showing a handheld electronic device according to various embodiments of the present disclosure.

FIG. 16 is a block diagram showing a handheld electronic device according to various embodiments of the present disclosure.

Referring to FIG. 16, a network environment 1600 including an electronic device 1610 is illustrated. The electronic device 1610 may include a bus 1680, a processor 1620, a memory 1630, an input/output interface 1650, a display 1660, and a communication interface 1670. According to some embodiments, at least one of the above described components may be omitted from the electronic device 1610 or another component may be further included in the electronic device 1610.

The bus 1680 may be a circuit connecting the above described components 1620, 1630, 1650, 1660, 1670 and 1680 and transmitting communications (e.g., control messages and/or data) between the above described components.

The processor 1620 is capable of including one or more of the following: a CPU, an AP, and a CP. The processor 1620 is capable of controlling at least one of other components of the electronic device 1610 and/or processing data or operations related to communication.

The memory 1630 is capable of including volatile memory and/or non-volatile memory. The memory 1630 is capable of storing data or commands related to at least one of other components of the electronic device 1610. According to an embodiment, the memory 1630 is capable of storing software and/or a program module 1640. For example, the program module 1640 is capable of including a kernel 1640A, middleware 1640B, application programming interface (API) 1640C, application programs (or applications) 1640D, and the like. The kernel 1640A, middleware 1640B or at least part of the API 1640C may be called an operating system (OS).

The kernel 1640A is capable of controlling or managing system resources (e.g., the bus 1680, processor 1620, memory 1630, and the like) used to execute operations or functions of other programs (e.g., the middleware 1640B, API 1640C, and application programs 1640D). The kernel 1640A provides an interface capable of allowing the middleware 1640B, API 1640C, and application programs 1640D to access and control/manage the individual components of the electronic device 1610.

The middleware 1640B is capable of mediating between the API 1640C or application programs 1640D and the kernel 1640A so that the API 1640C or the application programs 1640D can communicate with the kernel 1640A and exchange data therewith. The middleware 1640B is capable of processing one or more task requests received from the application programs 1640D according to the priority. For example, the middleware 1640B is capable of assigning a priority for use of system resources of the electronic device 1610 (e.g., the bus 1680, processor 1620, memory 1630, and the like) to at least one of the application programs 1640D. For example, the middleware 1640B processes one or more task requests according to a priority assigned to at least one application program, thereby performing scheduling or load balancing for the task requests.

The API 1640C refers to an interface configured to allow the application programs 1640D to control functions provided by the kernel 1640A or the middleware 1640B. The API 1640C is capable of including at least one interface or function (e.g., instructions) for file control, window control, image process, text control, or the like.

The input/output interface 1650 is capable of transferring instructions or data, received from the user or external devices, to one or more components of the electronic device 1610. The input/output interface 1650 is capable of outputting instructions or data, received from one or more components of the electronic device 1610, to the user or external devices.

The display 1660 is capable of including a liquid crystal display (LCD), a flexible display, a transparent display, an LED display, an organic LED (OLED) display, micro-electro-mechanical systems (MEMS) display, an electronic paper display, and the like. The display 1660 is capable of displaying various types of content (e.g., texts, images, videos, icons, symbols, and the like). The display 1660 may also be implemented with a touch screen. In this case, the display 1660 is capable of receiving touches, gestures, proximity inputs or hovering inputs, via a stylus pen, or a user's body.

The communication interface 1670 is capable of establishing communication between the electronic device 1610 and an external device (e.g., a first external device 1691, a second electronic device 1692, or a server 1693). For example, the communication interface 1670 is capable of communicating with an external device (e.g., a second external device 1692 or a server 1693) connected to a network 1694 via wired or wireless communication.

Wireless communication may employ, as cellular communication protocol, at least one of the following: LTE, LTE-A, CDMA, WCDMA, UMTS, WiBro, and GSM. Wireless communication may also include short-range communication 1695. Short-wireless communication 1695 may include at least one of the following: Wi-Fi, BT, NFC, MST, and global navigation satellite system (GNSS). The GNSS may include at least one of the following: GPS, global navigation satellite system (GLONASS), BeiDou navigation satellite system (hereinafter called 'BeiDou'), Galileo, the European global satellite-based navigation system, according to GNSS using areas, bandwidths, and the like. In the present disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 1694 may include at least one of the following: a telecommunications network, e.g., a computer network (e.g., local area network (LAN) or wide area network (WAN)), the Internet, and a telephone network.

The first and second external electronic devices 1691 and 1692 are each identical to or different from the electronic device 1610, in terms of type. According to an embodiment, the server 1693 is capable of including a group of one or more servers. According to various embodiments, part or all of the operations executed on the electronic device 1610 may be executed on another electronic device or a plurality of other electronic devices (e.g., the external electronic devices 1691 and 1692 or the server 1693). According to an embodiment, when the electronic device needs to perform a function or service automatically or according to a request, it does not perform the function or service, but is capable of additionally requesting at least part of the function related to the function or service from other electronic device (e.g., the external electronic devices 1691 and 1692 or the server 1693). The other electronic device (e.g., the external electronic devices 1691 and 1692 or the server 1693) is capable of executing the requested function or additional functions, and transmitting the result to the electronic device 1610. The electronic device 1610 processes the received result, or further proceeds with additional processes, to provide the requested function or service. To this end, the electronic device 1610 may employ cloud computing, distributed computing, or client-server computing technology.

FIG. 17 is a block diagram showing an electronic device according to various embodiments of the present disclosure.

Referring to FIG. 17, a detailed block diagram of a configuration of an electronic device 1701 is illustrated. For example, the electronic device 1701 is capable of including part or all of the components in the electronic device 1610 shown in FIG. 16. The electronic device 1701 is capable of including one or more processors 1710 (e.g., APs), a communication module 1720, a SIM 1724, a memory 1730, a sensor module 1740, an input device 1750, a display 1760, an interface 1770, an audio module 1780, a camera module 1791, a power management module 1795, a battery 1796, an indicator 1797, and a motor 1798.

The processor 1710 is capable of driving, for example, an OS or an application program to control a plurality of hardware or software components connected to the processor 1710, processing various data, and performing operations. The processor 1710 may be implemented as, for example, an SoC. According to an embodiment, the processor 1710 may further include a graphics processing unit (GPU) and/or an ISP. The processor 1710 may also include at least part of the components shown in FIG. 17 (e.g., a cellular module 1721). The processor 1710 is capable of loading commands or data received from at least one of other components (e.g., a non-volatile memory) on a volatile memory, and processing the loaded commands or data. The processor 1710 is capable of storing various data in a non-volatile memory.

The communication module 1720 may include the same or similar configurations as the communication interface 1670 shown in FIG. 16. For example, the communication module 1720 is capable of including the cellular module 1721, a Wi-Fi module 1723, a BT module 1725, a GNSS module 1726 (e.g., a GPS module, GLONASS module, BeiDou module or Galileo module), an NFC module 1727, a MST module 1728, and an RF module 1729.

The cellular module 1721 is capable of providing a voice call, a video call, an SMS service, an Internet service, and the like, through a communication network, for example. According to an embodiment, the cellular module 1721 is capable of identifying and authenticating an electronic device 1701 in a communication network by using a SIM 1724 (e.g., a SIM card). According to an embodiment, the cellular module 1721 is capable of performing at least part of the functions provided by the processor 1710. According to an embodiment, the cellular module 1721 is also capable of including a CP.

Each of the Wi-Fi module 1723, the BT module 1725, the GNSS module 1726, and the NFC module 1727 is capable of including a processor for processing data transmitted or received through the corresponding module. The MST module 1728 is capable of including a processor for processing data transmitted or received through the corresponding module. According to embodiments, at least part of the cellular module 1721, the Wi-Fi module 1723, the BT module 1725, the GNSS module 1726, the NFC module 1727, and the MST module 1728 (e.g., two or more modules) may be included in one IC or one IC package.

The RF module 1729 is capable of transmission/reception of communication signals, e.g., RF signals. The RF module 1729 is capable of including a transceiver, a PAM, a frequency filter, an LNA, an antenna, and the like. According to an embodiment, at least one of the following modules: the cellular module 1721, the Wi-Fi module 1723, the BT module 1725, the GNSS module 1726, the NFC module 1727, and the MST module 1728 is capable of transmission/reception of RF signals through a separate RF module.

The SIM module 1724 is capable of including a card including a SIM and/or an embodied SIM. The SIM module 1724 is also capable of containing unique identification information, e.g., IC card identifier (ICCID), or subscriber information, e.g., international mobile subscriber identity (IMSI).

The memory 1730 (e.g., the memory 1630 shown in FIG. 16) is capable of including a built-in memory 1732 or an external memory 1734. The built-in memory 1732 is capable of including at least one of the following: a volatile memory, e.g., a dynamic random access memory (DRAM), a static RAM (SRAM), a synchronous DRAM (SDRAM), and the like; and a non-volatile memory, e.g., a one-time programmable read only memory (OTPROM), a PROM, an erasable and programmable ROM (EPROM), an electrically erasable and programmable ROM (EEPROM), a mask ROM, a flash ROM, a flash memory (e.g., a NAND flash memory, an NOR flash memory, and the like), a hard drive, a solid state drive (SSD), and the like.

The external memory 1734 is also capable of including a flash drive, e.g., a compact flash (CF), a secure digital (SD), a micro-SD, a mini-SD, an extreme digital (xD), a multimedia card (MMC), a memory stick, and the like. The external memory 1734 is capable of being connected to the electronic device 1701, functionally and/or physically, through various interfaces.

The memory 1730 is capable of storing payment information and a payment application serving as one of the application programs 1640D. The payment information may refer to credit card numbers and personal identification numbers (PINs), corresponding to a credit card. The payment information may also include user authentication information, e.g., fingerprints, facial features, voice information, and the like.

When the payment application is executed by the processor 1710, it may enable the processor 1710 to perform an interaction with the user to make payment (e.g., displaying a screen to select a card (or a card image) and obtaining information (e.g., a card number) corresponding to a selected card (e.g., a pre-specified card) from payment information); and an operation to control magnetic field communication (e.g., transmitting the card information to an external device (e.g., a card reading apparatus) through the NFC module 1727 or MST module 1728).

The sensor module 1740 is capable of measuring/detecting a physical quantity or an operation state of the electronic device 1701, and converting the measured or detected information into an electronic signal. The sensor module 1740 is capable of including at least one of the following: a gesture sensor 1740A, a gyro sensor 1740B, an atmospheric pressure sensor 1740C, a magnetic sensor 1740D, an acceleration sensor 1740E, a grip sensor 1740F, a proximity sensor 1740G, a color sensor 1740H (e.g., a red, green and blue (RGB) sensor), a biometric sensor 1740I, a temperature/humidity sensor 1740J, an illuminance sensor 1740K, and a ultraviolet (UV) sensor 1740M. Additionally or alternatively, the sensor module 1740 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 1740 is capable of further including a control circuit for controlling one or more sensors included therein. In embodiments, the electronic device 1701 is capable of including a processor, configured as part of the processor 1710 or a separate component, for controlling the sensor module 1740. In this case, while the processor 1710 is operating in sleep mode, the processor is capable of controlling the sensor module 1740.

The input device 1750 is capable of including a touch panel 1752, a (digital) pen sensor 1754, a key 1756, or an ultrasonic input unit 1758. The touch panel 1752 may be implemented with at least one of the following: a capacitive touch system, a resistive touch system, an infrared touch system, and an ultrasonic touch system. The touch panel 1752 may further include a control circuit. The touch panel 1752 may also further include a tactile layer to provide a tactile response to the user.

The (digital) pen sensor 1754 may be implemented with a part of the touch panel or with a separate recognition sheet. The key 1756 may include a physical button, an optical key, or a keypad. The ultrasonic input unit 1758 is capable of detecting ultrasonic waves, created in an input tool, through a microphone 1788, and identifying data corresponding to the detected ultrasonic waves.

The display 1760 (e.g., the display 1660 shown in FIG. 16) is capable of including a panel 1762, a hologram unit 1764, or a projector 1766. The panel 1762 may include the same or similar configurations as the display 1660 shown in FIG. 16. The panel 1762 may be implemented to be flexible, transparent, or wearable. The panel 1762 may also be incorporated into one module together with the touch panel 1752. The hologram unit 1764 is capable of showing a stereoscopic image in the air by using light interference. The projector 1766 is capable of displaying an image by projecting light onto a screen. The screen may be located inside or outside of the electronic device 1701. According to an embodiment, the display 1760 may further include a control circuit for controlling the panel 1762, the hologram unit 1764, or the projector 1766.

The interface 1770 is capable of including an HDMI 1772, a USB 1774, an optical interface 1776, or a D-sub-miniature (D-sub) 1778. The interface 1770 may be included in the communication interface 1670 shown in FIG. 16. Additionally or alternatively, the interface 1770 is capable of including a mobile high-definition link (MHL) interface, an SD card/MMC interface, or an infrared data association (IrDA) standard interface.

The audio module 1780 is capable of providing bidirectional conversion between a sound and an electronic signal. At least part of the components in the audio module 1780 may be included in the input/output interface 1650 shown in FIG. 16. The audio module 1780 is capable of processing sound information input or output through a speaker 1782, a receiver 1784, earphones 1786, microphone 1788, and the like.

The camera module 1791 refers to a device capable of taking both still and moving images. According to an embodiment, the camera module 1791 is capable of including one or more image sensors (e.g., a front image sensor or a rear image sensor), a lens, an ISP, a flash (e.g., an LED or xenon lamp), and the like.

The power management module 1795 is capable of managing power of the electronic device 1701. According to an embodiment, the power management module 1795 is capable of including a PMIC, a charger IC, or a battery or fuel gauge. The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, and the like. The battery gauge is capable of measuring the residual capacity, charge in voltage, current, or temperature of the battery 1796. The battery 1796 takes the form of either a rechargeable battery or a solar battery.

The indicator 1797 is capable of displaying a specific status of the electronic device 1701 or a part thereof (e.g., the processor 1710), e.g., a boot-up status, a message status, a charging status, and the like. The motor 1798 is capable of converting an electrical signal into mechanical vibrations, such as, a vibration effect, a haptic effect, and the like. Although not shown, the electronic device 1701 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, and the like.

Figure 18:
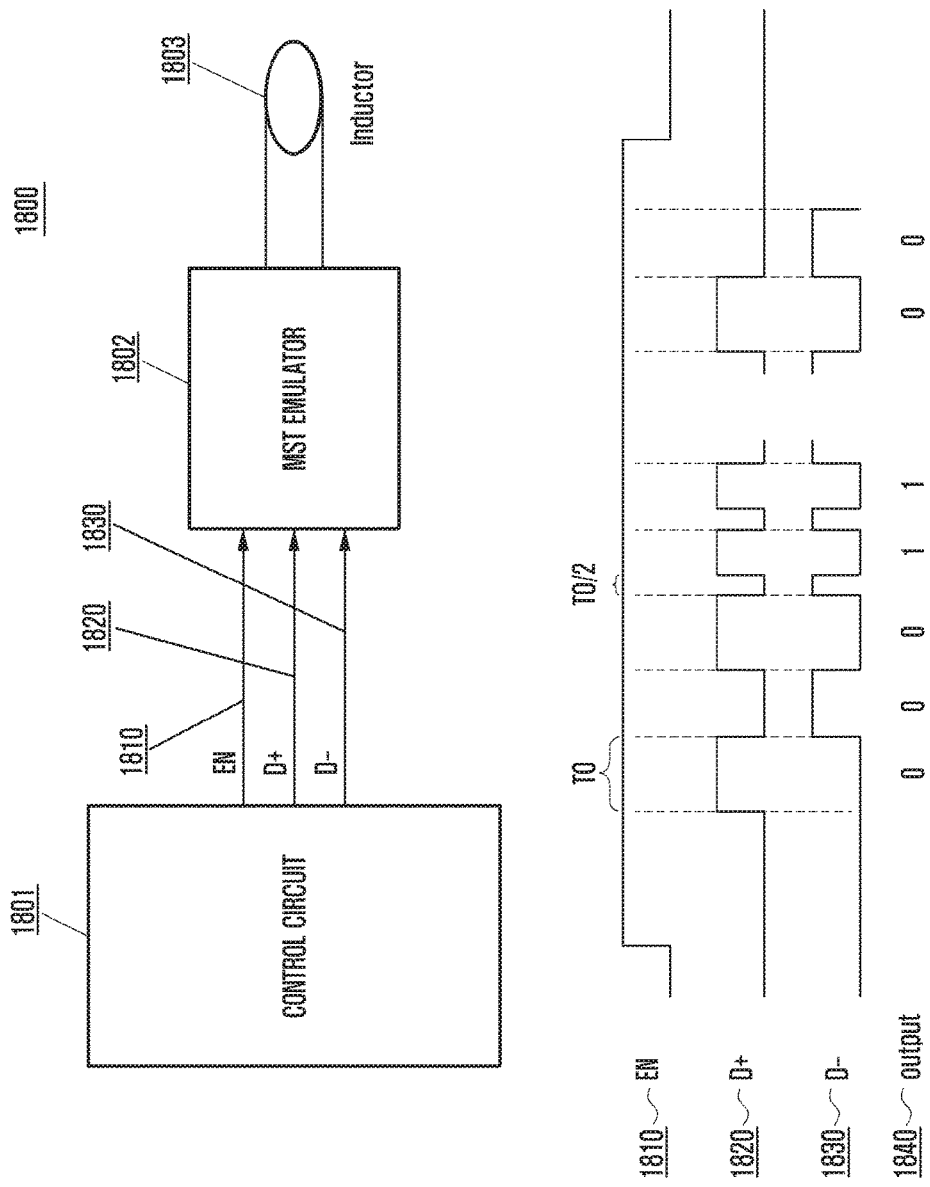
FIG. 18 is a diagram that describes a magnetic secure transmission (MST) module according to various embodiments of the present disclosure.

FIG. 18 is a diagram that describes an MST module according to various embodiments of the present disclosure. It should be understood that the configuration of the MST module shown in FIG. 18 is an example and the present disclosure is not limited thereto.

Referring to FIG. 18, an MST module 1800 is capable of receiving control signals 1810, 1820 and 1830 from a control circuit 1801 including a processor. An MST emulator 1802 is capable of converting payment information into magnetic field signals to broadcast the magnetic field signals via an MST antenna 1803, according to the control signal. The control circuit 1801 is capable of providing signals, EN, D+, and D−. When an MST signal interval starts in a signal cycle, the control circuit 1801 maintains the EN signal at a logic level, High, so that the MST emulator 1802 operates.

When the EN signal is maintained at a logic level, High, the control circuit 1801 is capable of providing payment information such as information regarding a credit card, and the like, via signals D+ 1820 and D− 1830. The signals D+ and D− have waveforms that have opposite phase, or are providing payment information such as information of the signals D+ and D− are maintained during a specified interval, T0, the output value, OUTPUT 1840, is 0. When the states of the signals D+ 1820 and D− 1830 vary during a specified interval, T0, the output value, OUTPUT 1840, is 1. The payment receiving apparatus combines the bit values corresponding to the output values, OUTPUT 1840, to recognize the payment information.

According to various embodiments, the MST emulator 1802 is connected to the MST antenna 1803 that is configured to include a plurality of coils that differ from each other. In an embodiment, the MST emulator 1802 is configured to provide a plurality of input units and a plurality of output units, and the MST antenna 1803 is configured to include a plurality of different coils that are connected to a plurality of output units included in the MST emulator 1802.

Figure 19A:
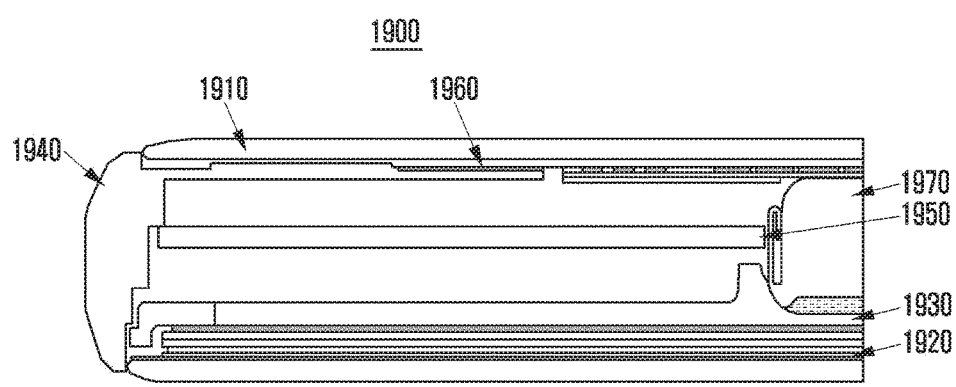
FIGS. 19A to 19C are diagrams show the structure of an antenna configured to perform magnetic payment and a handheld electronic device with the antenna according to various embodiments of the present disclosure.
Figure 19B:
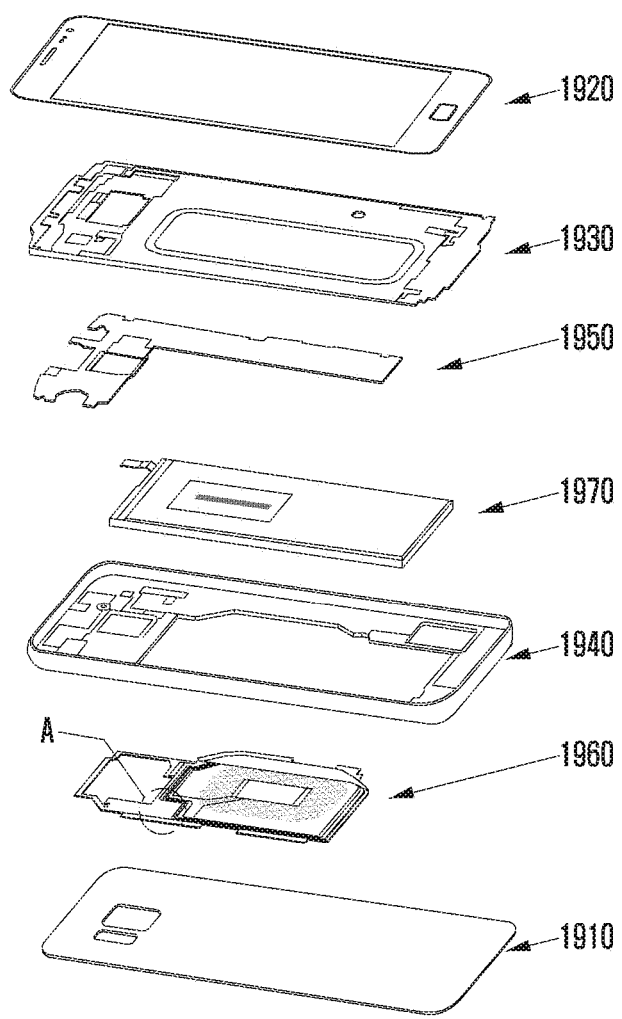
Figure 19C:
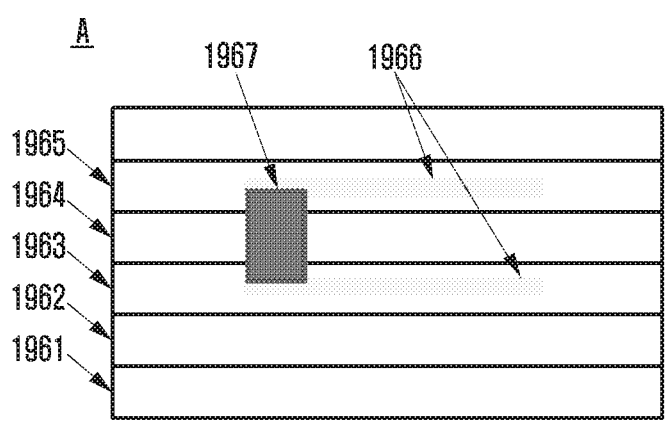

FIGS. 19A to 19C are diagrams that show the structure of an antenna configured to perform magnetic payment and a handheld electronic device \ with the antenna according to various embodiments of the present disclosure.

Referring to FIGS. 19A and 19B, a handheld electronic device 1900 is capable of including housings 1910, 1920, and 1940, located to disclose at least part of the appearance of the handheld electronic device 1900, and a support 1930 located inside the handheld electronic device 1900. The housing 1940 is made of a single material or a mixture of heterogeneous materials. The housing 1940 may be arranged to support at least part of the housings 1910 and 1920. The internal support 1930 is made of a single material or a mixture of heterogeneous materials. The internal support 1930 may be arranged to support at least part of the housing 1920. At least part of the area of the housings 1910 and 1920 may include the display area. The housings 1910 and 1940 and the support 1930 form an enclosure. The enclosure is capable of housing a PCB 1950 and a battery 1970.

According to various embodiments, the handheld electronic device 1900 is capable of including an antenna 1960 (e.g., a coil antenna) for magnetic payment. The antenna 1960 is located to cover at least part of the housing 1940 and the battery 1970. The antenna 1960 is connected to the PCB 1950 through an opening of the housing 1940 to perform data communication for payment with a payment module or a processor located on the PCB 1950. The housings 1940 and 1910 may be formed in such a way that part of the area to which the antenna 1970 is attached differs in height or thickness from the surrounding area.

According to various embodiments, the housing 1940 may be formed in such a way that an area where a coil (e.g., a metal pattern) of the antenna 1960 is located is made of a material that differs from that of another area where the coil of the antenna 1960 is not located. For example, the area where the coil of the antenna 1960 is located may include a non-conductive material (e.g., plastic). The area where the coil of the antenna 1960 is not located may include a conductive material (e.g., metal).

Referring to FIG. 19C, the antenna 1960 may be formed using an FPCB including multi-layers 1963-1965. At least one of the multi-layers 1963-1965 is capable of including a via 1967 and wires 1966 forming an antenna coil. The antenna 1960 may be configured with a single coil. The antenna 1960 may also be configured with two or more coils that differ from each other. According to various embodiments, the antenna 1960 is capable of including a layer 1961 for shielding noise. The shield layer 1961 may be formed with a material such as graphite, and the like. According to an embodiment, the antenna 1960 may further include a magnetic body layer 1962 for increasing the intensity of magnetic field signals produced by the coil. The magnetic body layer 1962 may be formed with, for example, a permanent magnet, ferromagnetic material, and the like.

FIGS. 20A to 20C are diagrams that show formats of data recorded in tracks of a magnetic card according to various embodiments of the present disclosure.

Referring to FIGS. 20A to 20C, the magnetic card records data in track 1, track 2 and track 3. Card readers are equipped with a coil and a header for reading data recorded in magnetic stripe tracks of a magnetic card. When a track (i.e., a magnetic black line) of a magnetic card is swiped over the header of the rail of a card reader, the lines of magnetic force passing through the coil connected to the header are changed. The change in the lines of magnetic force induces current in the card reader. The card reader is capable of reading and processing data recorded in the card tracks from the induced current.

The handheld electronic device is capable of including a module for storing data recorded in tracks of a magnetic card and for performing magnetic field communication, e.g., an MST module. The MST module is capable of transmitting magnetic signals with data recorded in magnetic card tracks to the magnetic card reader via an antenna (e.g., a cover 1010). The card reader receives the magnetic signals and produces the same current as the magnetic card is swiped over the header. Therefore, the user can make a payment as he/she holds his/her handheld electronic device near the card reader or contacts the card reader with his/her handheld electronic device.

FIG. 21 is a diagram that describes a data transmission method according to various embodiments of the present disclosure.

Referring to FIG. 21, data that an MST module transmits via magnetic signals may have a token type. In a payment using a token, a Cryptogram is substituted for at least part of the data recorded in tracks 1, 2 and 3, not tracks 1, 2, and 3, and the substituted value is transformed into bits to be transmitted to the card reader via the MST signals. When the data format of track is used, the card reader may transmit the token information to a credit card company, without any additional alternation. The token may include an ID for identifying a credit card. The token may also include information for identifying a credit card company. Transaction data may contain a credit card expiration date, a merchant ID, a combination of part of transaction-related information, and the like.

Figure 22:
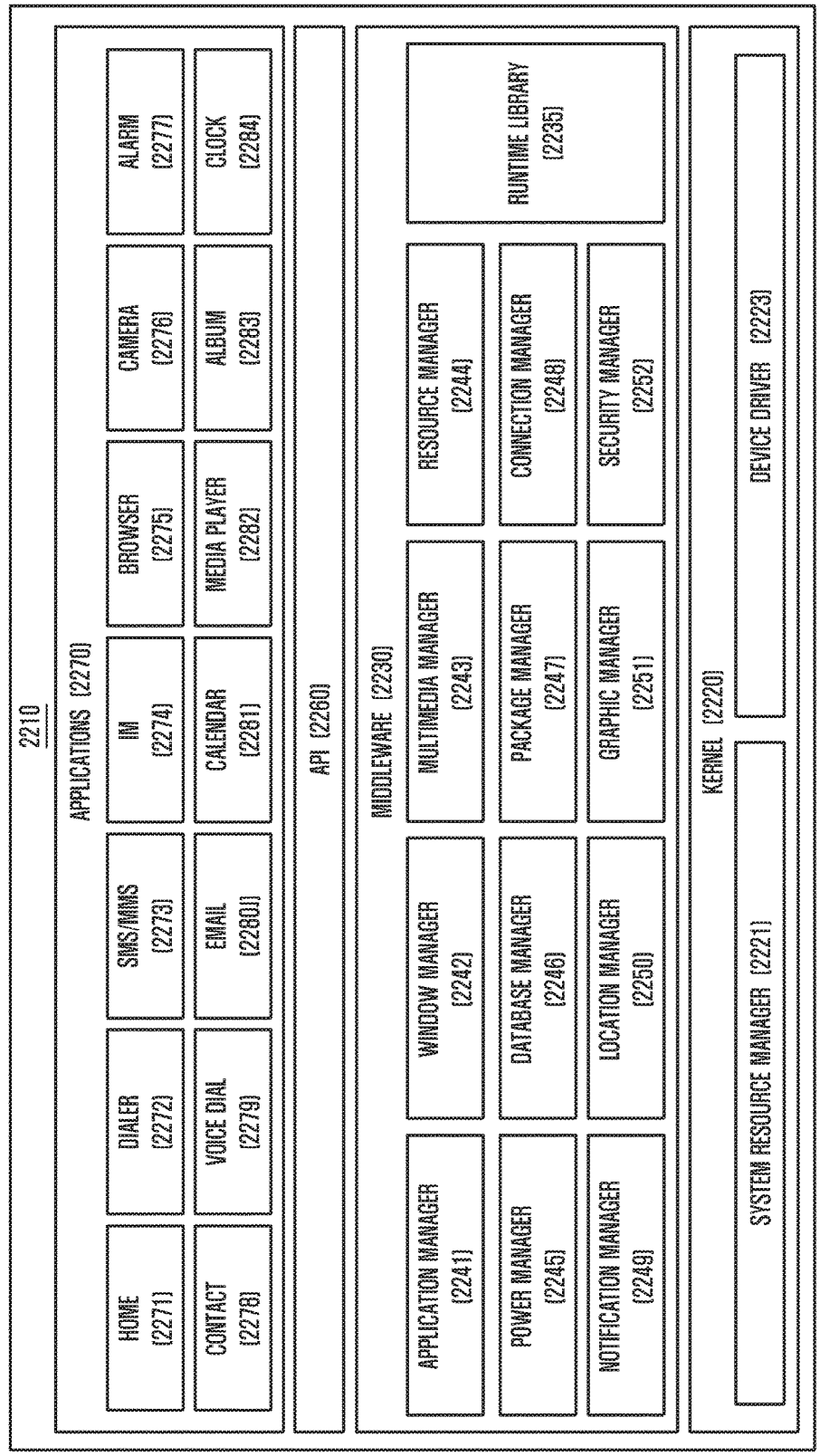
FIG. 22 is a block diagram showing a program module according to various embodiments of the present disclosure.

FIG. 22 is a block diagram of a programming module according to various embodiments of the present disclosure.

Referring to FIG. 22, according to an embodiment, a program module 2210 (e.g., program module 1640 shown in FIG. 16) is capable of including an OS for controlling resources related to the electronic device (e.g., electronic device 1610) and/or various applications (e.g., application programs 1640D shown in FIG. 16) running on the OS. The OS may be Android, iOS, Windows, Symbian, Tizen, Bada, and the like.

The program module 2210 is capable of including a kernel 2220, middleware 2230, API 2260 and/or applications 2270. At least part of the program module 2210 may be preloaded on the electronic device or downloaded from a server (e.g., an electronic device 1691 or 1692, server 1693, and the like).

The kernel 2220 (e.g., kernel 1640A) may include a system resource manager 2221 and/or a device driver 2223. The system resource manager 2221 may include, for example, a process manager, a memory manager, and a file system manager. The system resource manager 2221 may perform a system resource control, allocation, and recall. The device driver 2223 may include, for example, a display driver, a camera driver, a BT driver, a shared memory driver, a USB driver, a keypad driver, a Wi-Fi driver, and an audio driver. Further, according to an embodiment, the device driver 2223 may include an inter-process communication (IPC) driver.

The middleware 2230 may provide a function required in common by the applications 2270. Further, the middleware 2230 may provide a function through the API 2260 to allow the applications 2270 to efficiently use limited system resources within the electronic device. According to an embodiment, the middleware 2230 (e.g., the middleware 1640B) may include at least one of a runtime library 2235, an application manager 2241, a window manager 2242, a multimedia manager 2243, a resource manager 2244, a power manager 2245, a database manager 2246, a package manager 2247, a connection manager 2248, a notification manager 2249, a location manager 2250, a graphic manager 2251, and a security manager 2252.

The runtime library 2235 may include, for example, a library module used by a complier to add a new function through a programming language while the applications 2270 are executed. According to an embodiment, the runtime library 2235 executes input and output, management of a memory, a function associated with an arithmetic function and the like.

The application manager 2241 may manage, for example, a life cycle of at least one of the applications 2270. The window manager 2242 may manage graphical user interface (GUI) resources used on the screen. The multimedia manager 2243 may detect a format required for reproducing various media files and perform an encoding or a decoding of a media file by using a codec suitable for the corresponding format. The resource manager 2244 manages resources such as a source code, a memory, or a storage space of at least one of the applications 2270.

The power manager 2245 may operate together with a basic input/output system (BIOS) to manage a battery or power and provides power information required for the operation. The database manager 2246 may manage generation, search, and change of a database to be used by at least one of the applications 2270. The package manager 2247 may manage an installation or an update of an application distributed in a form of a package file.

The connection manager 2248 may manage, for example, a wireless connection such as Wi-Fi or BT. The notification manager 2249 may display or notify a user of an event such as an arrival message, an appointment, a proximity alarm or the like, in a manner that does not disturb the user. The location manager 2250 may manage location information of the electronic device. The graphic manager 2251 may manage a graphic effect provided to the user or a user interface related to the graphic effect. The security manager 2252 provides a general security function required for a system security or a user authentication. According to an embodiment, when the electronic device (e.g., the electronic device 1610) has a call function, the middleware 2230 may further include a telephony manager for managing a voice of the electronic device or a video call function.

The middleware 2230 is capable of including modules configuring various combinations of functions of the above described components. The middleware 2230 is capable of providing modules specialized according to types of operation systems to provide distinct functions. The middleware 2230 may be adaptively configured in such a way as to remove part of the existing components or to include new components.

The API 2260 (e.g., API 1640C) may be a set of API programming functions, and may be provided with a different configuration according to an OS. For example, in Android or iOS, a single API set may be provided for each platform. In Tizen, two or more API sets may be provided.

The applications 2270 (e.g., application programs 1640D) may include one or more applications for performing various functions, e.g., home 2271, dialer 2272, SMS/multimedia message service (MMS) 2273, instant message (IM) 2274, browser 2275, camera 2276, alarm 2277, context 2278, voice dial 2279, email 2280, calendar 2281, media player 2282, album 2283, clock 2284, health care (e.g., an application for measuring amount of exercise, blood sugar level, and the like), and environment information (e.g., an application for providing atmospheric pressure, humidity, temperature, and the like).

According to an embodiment, the applications 2270 are capable of including an application for supporting information exchange between an electronic device (e.g., electronic device 1610) and an external device (e.g., electronic devices 1691 and 1692), which is hereafter called 'information exchange application'). The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, and the like) to external devices (e.g., electronic devices 1691 and 1692). In addition, the notification relay application is capable of receiving notification information from external devices to provide the received information to the user.

The device management application is capable of managing (e.g., installing, removing or updating) at least one function of an external device (e.g., electronic devices 1691 and 1692) communicating with the electronic device. Examples of the function are a function of turning-on/off the external device or part of the external device, a function of controlling the brightness (or resolution) of the display, applications running on the external device, services provided by the external device, and the like. Examples of the services are a call service, messaging service, and the like.

According to an embodiment, the applications 2270 are capable of including an application (e.g., a health care application of a mobile medical device, and the like) specified attributes of an external device (e.g., electronic devices 1691 and 1692). According to an embodiment, the applications 2270 are capable of including applications received from an external device (e.g., a server 1693, electronic devices 1691 and 1692). According to an embodiment, the applications 2270 are capable of including a preloaded application or third party applications that can be downloaded from a server. It should be understood that the components of the program module 2210 may be called different names according to types of OSs.

According to various embodiments, at least part of the program module 2210 can be implemented with software, firmware, hardware, or any combination of two or more of them. At least part of the program module 2210 can be implemented (e.g., executed) by a processor (e.g., processor 1620). At least part of the programming module 2210 may include modules, programs, routines, sets of instructions or processes, and the like, in order to perform one or more functions.

The antenna apparatus and the electronic device with the antenna apparatus, according to various embodiments, can use the metal cover of the electronic device as part of the antenna, thereby reducing the issue of spatial limitation for the antenna. The antenna apparatus and the electronic device with the antenna apparatus can also use the cover of the electronic device as part of the antenna, thereby reducing the cost of the electronic devices and improving the aesthetics of electronic devices.

The term of the electronic devices and embodiments of the present disclosure may mean a unit including one of hardware, software, and firmware or any combination of two or more of them. The 'module' may be interchangeable with the term 'unit,' 'logic,' 'logical block,' 'component,' or 'circuit.' The 'module' may be the smallest unit of an integrated component or a part thereof. The 'module' may be the smallest unit that performs one or more functions or a part thereof. The 'module' may be mechanically or electronically implemented. For example, the 'module' according to various embodiments of the present disclosure may include at least one of the following: application-specific IC (ASIC) chips, field-programmable gate arrays (FPGAs), and programmable-logic devices for performing certain operations, which are now known or will be developed in the future.

At least part of the method (e.g., operations) or system (e.g., modules or functions) according to various embodiments can be implemented with instructions as programming modules that are stored in computer-readable storage media. One or more processors (e.g., processor 1620) can execute instructions, thereby performing the functions. An example of the computer-readable storage media may be a memory 1630. At least part of the programming modules can be implemented (executed) by a processor. At least part of the programming module may include modules, programs, routines, sets of instructions or processes, and the like, in order to perform one or more functions.

Examples of computer-readable media include magnetic media, such as hard disks, floppy disks, and magnetic tape; optical media such as compact disc ROM (CD-ROM) disks and DVD; magneto-optical media, such as floptical disks; and hardware devices that are specially configured to store and perform program instructions (e.g., programming modules), such as ROM, RAM, flash memory, and the like. Examples of program instructions include machine code instructions created by assembly languages, such as a compiler, and code instructions created by a high-level programming language executable in computers using an interpreter, and the like. The described hardware devices may be configured to act as one or more software modules in order to perform the operations and methods described above, or vice versa.

Modules or programming modules according to various embodiments may include one or more components, remove part of them described above, or include new components. The operations performed by modules, programming modules, or the other components, according to various embodiments, may be executed in serial, parallel, repetitive or heuristic fashion. Part of the operations can be executed in any other order, skipped, or executed with additional operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A handheld electronic device comprising:
a front cover forming a front of the handheld electronic device;
a back cover forming a back of the handheld electronic device;
a side member at least partially surrounding a space between the front cover and the back cover;
a display module, housed in the space, with a screen area exposed through the front cover; and
a ground plate housed in the space;
a first communication module housed in the space; and
a second communication module, housed in the space, of which a frequency differs from that of the first communication module,
wherein at least part of the side member and the back cover comprises a conductive material,
wherein the handheld electronic device further comprises a first feeding point, a second feeding point and a third feeding point,
wherein the at least part forms at least part of an antenna of the handheld electronic device, and comprises a first area and a second area,
wherein the first area is electrically connected to the first communication module via the first feeding point,
wherein the first area is electrically connected to the second communication module via the third feeding point,
wherein the second area is electrically connected to the first communication module via the second feeding point,
wherein the handheld electronic device further comprises a conductive part electrically connected between the first area and the second area, and
wherein current of the frequency corresponding to the first communication module flows between the first area and the second area through the conductive part, and current of a frequency corresponding to the second communication module does not flow between the first area and the second area through the conductive part.

2. The handheld electronic device of claim 1, wherein the conductive part comprises:
an inductor.

3. The handheld electronic device of claim 1,
wherein the back cover further comprises a third area made of a non-conductive material,
wherein first and second sections of the second area are located to a left and right of the third area, respectively, and
wherein a third section of the second area and the first area are located to a bottom and a top of the third area, respectively.

4. The handheld electronic device of claim 3, wherein the first, second and third areas form at least part of a rear of the handheld electronic device, or at least part of an external cover covering the rear.

5. The handheld electronic device of claim 1, further comprising:
a coil,
wherein the second feeding point is electrically connected to a first electrode of the coil, and
wherein the first communication module is electrically connected to a second electrode of the coil.

6. The handheld electronic device of claim 5,
wherein the first and second areas form at least part of a rear of the handheld electronic device, and
wherein the coil is attached to a lower surface of the back cover covering the rear.

7. The handheld electronic device of claim 1, further comprising:
a third communication module, electrically connected to the first feeding point, of which a frequency differs from that of the first communication module;
a first coil;
a second coil;
a first diplexer; and
a second diplexer,
wherein the second feeding point is electrically connected to a first electrode of the first coil, and the second feeding point is electrically connected to a first electrode of the second coil,
wherein the first communication module is electrically connected to a second electrode of the first coil via the first diplexer so that current of the frequency corresponding to the first communication module flows in the first coil and current of a frequency corresponding to the third communication module does not flow in the second coil, and
wherein the third communication module is electrically connected to a second electrode of the second coil via the second diplexer so that current of the frequency corresponding to the first communication module does not flow in the first coil and current of a frequency corresponding to the third communication module flows in the second coil.

8. The handheld electronic device of claim 7,
wherein the first and second areas form at least part of a rear of the handheld electronic device, and
wherein the first and second coils are attached to a lower surface of an external cover covering the rear.

9. The handheld electronic device of claim 1, wherein the first and second areas serve as a radiator, and transmit magnetic field signals containing magnetic secure transmission (MST) data.

10. A handheld electronic device comprising:
a front cover forming a front of the handheld electronic device;
a back cover forming a back of the handheld electronic device;
a side member at least partially surrounding a space between the front cover and the back cover;
a display module, housed in the space, with a screen area exposed through the front cover; and
a coil, a switch and a communication module, which are housed in the space,
wherein at least part of the side member and/or the back cover comprises a conductive material,
wherein the at least part forms at least part of an antenna of the handheld electronic device, and comprises first, second and third areas which are spaced apart from each other,
wherein the communication module is electrically connected to a first electrode of the switch and a first electrode of the coil,
wherein the first area is electrically connected to a second electrode of the switch and the second area,
wherein the second area is electrically connected to a second electrode of the coil and the third area,
wherein the third area is electrically connected to a third electrode of the switch,
wherein the first electrode of the switch is connected to the second electrode of the switch or the third electrode of the switch,
wherein, upon the first electrode of the switch being connected to the second electrode of the switch and the communication module supplying current to the first electrode of the switch, a first current path is formed through the first area, the second area and the coil, and
wherein, upon the first electrode of the switch being connected to the third electrode of the switch and the communication module supplying current to the first electrode of the switch, a second current path is formed through the third area.

* * * * *